(12) United States Patent
Rossi et al.

(10) Patent No.: US 7,857,610 B2
(45) Date of Patent: Dec. 28, 2010

(54) APPARATUS MAKING THERMOFORMED COMPONENT WITH INTEGRAL COINED STRUCTURE

(75) Inventors: Michael A. Rossi, Grosse Ile, MI (US); Joel M. Cormier, Lathrup Village, MI (US); Donald S. Smith, Commerce, MI (US); Matthew M. Gerwolls, Royal Oak, MI (US)

(73) Assignee: SafetyNet Energy Management, LLC, Taylor, MI (US)

( * ) Notice: Subject to any disclaimer, the term of this patent is extended or adjusted under 35 U.S.C. 154(b) by 0 days.

(21) Appl. No.: 12/363,952

(22) Filed: Feb. 2, 2009

(65) Prior Publication Data

US 2009/0230589 A1 Sep. 17, 2009

Related U.S. Application Data

(60) Provisional application No. 61/035,467, filed on Mar. 11, 2008.

(51) Int. Cl.
*B28B 11/00* (2006.01)
(52) U.S. Cl. ............... 425/398; 425/403; 425/324.1
(58) Field of Classification Search ........... 425/394, 425/398, 403, 324.1
See application file for complete search history.

(56) References Cited

U.S. PATENT DOCUMENTS

| | | | |
|---|---|---|---|
| 3,964,856 A | 6/1976 | Day | |
| 4,225,553 A * | 9/1980 | Hirota et al. | 264/292 |
| 4,462,786 A | 7/1984 | Perryman | |
| 4,465,963 A | 8/1984 | Iseard | |
| 5,879,724 A * | 3/1999 | Sakamoto | 425/385 |
| 6,017,084 A | 1/2000 | Carroll, III et al. | |
| 6,199,942 B1 | 3/2001 | Carroll, III et al. | |
| 6,247,745 B1 | 6/2001 | Carroll, III et al. | |
| 6,435,579 B1 | 8/2002 | Glance | |
| 6,443,513 B1 | 9/2002 | Glance | |
| 6,575,510 B2 | 6/2003 | Weissenborn | |
| 6,644,701 B2 | 11/2003 | Weissenborn et al. | |
| 6,679,967 B1 | 1/2004 | Carroll, III et al. | |
| 6,682,128 B2 | 1/2004 | Carroll, III et al. | |

(Continued)

FOREIGN PATENT DOCUMENTS

| | | |
|---|---|---|
| JP | 2001-269986 A | 10/2001 |
| KR | 10-2003-0050365 A | 6/2003 |

*Primary Examiner*—Joseph S. Del Sole
*Assistant Examiner*—Ninh V Le
(74) *Attorney, Agent, or Firm*—Price, Heneveld, Cooper, DeWitt & Litton, LLP

(57) ABSTRACT

A thermoforming process capable of coining and flowing material is provided, such as for making a thermoformed energy absorber for self-attachment to a vehicle bumper beam. The energy absorber includes a thermoplastic sheet with first thickness shaped by a thermoforming process to include a base and lobes configured to absorb energy. The sheet further has integrally formed attachments with solid heads formed from material flowed from adjacent areas into the attachment during the thermoforming process. Many other structures can be formed, such as ringed ridges, thinned regions, snap-attachments, hooks, living hinges, bosses, and the like. The present invention further includes an apparatus and a method for accomplishing the above, such as a heater for heating the sheet, and a die for stretching and shaping the sheet, where heated material is flowed by opposing coining die components to form selectively-shaped 3D structures.

25 Claims, 13 Drawing Sheets

U.S. PATENT DOCUMENTS

| | | |
|---|---|---|
| 6,752,450 B2 | 6/2004 | Carroll, III et al. |
| 7,131,674 B2 | 11/2006 | Evans et al. |
| 7,163,243 B2 | 1/2007 | Evans |
| 7,222,897 B2 | 5/2007 | Evans et al. |
| 7,360,822 B2 | 4/2008 | Carroll, III et al. |
| 7,377,577 B2 | 5/2008 | Carroll, III et al. |
| 7,384,095 B2 | 6/2008 | Cormier et al. |
| 7,404,593 B2 | 7/2008 | Cormier et al. |
| 2002/0149213 A1 | 10/2002 | Weissenborn |
| 2007/0108778 A1 | 5/2007 | Evans et al. |

\* cited by examiner

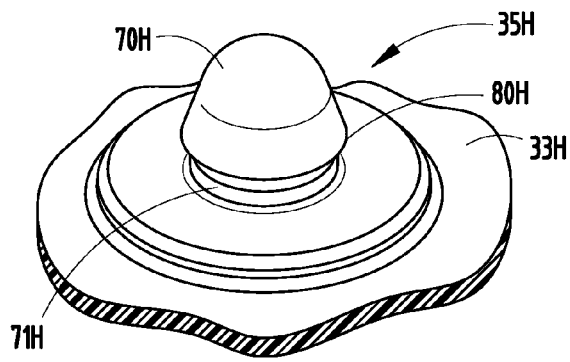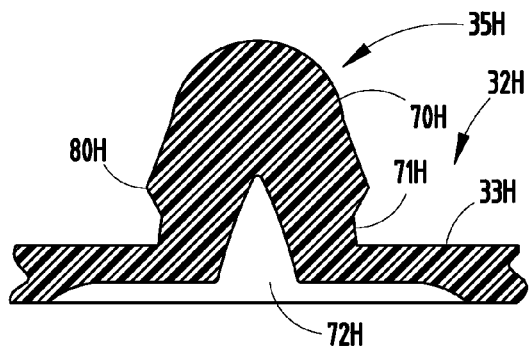
FIG. 14　　　　　　　FIG. 15
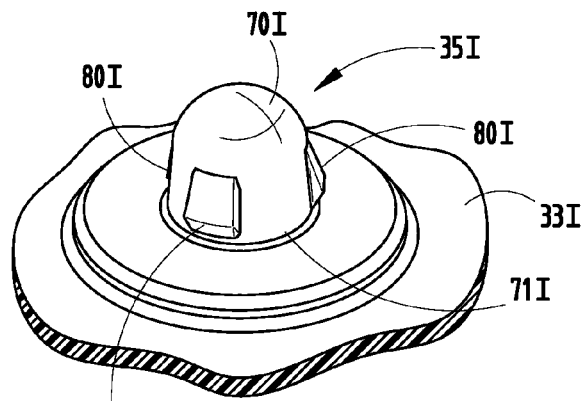
FIG. 16
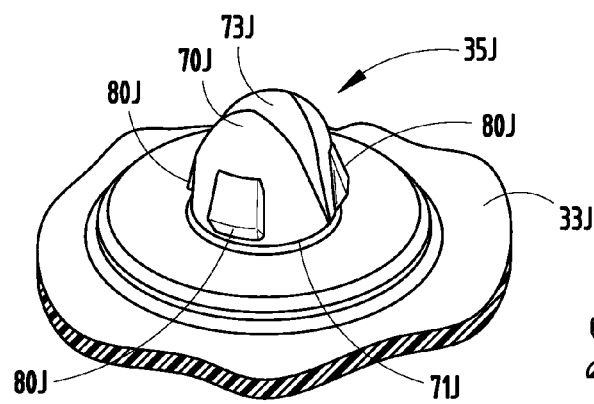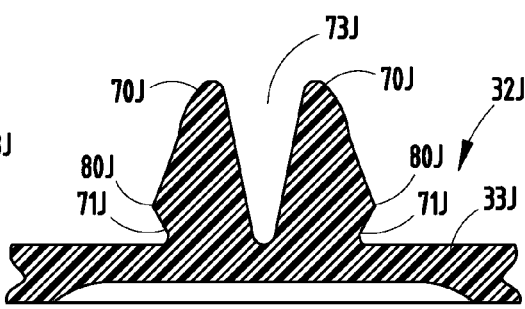
FIG. 17　　　　　　　FIG. 18

APPARATUS MAKING THERMOFORMED COMPONENT WITH INTEGRAL COINED STRUCTURE

This application claims benefit under 35 U.S.C. §119(e) provisional application Ser. No. 61/035,467, filed Mar. 11, 2008, entitled THERMOFORMED ENERGY ABSORBER WITH INTEGRAL ATTACHMENT STRUCTURE, the entire contents of which are incorporated herein in their entirety.

BACKGROUND

The present invention relates to thermoformed components such as energy absorbers for bumpers, and more particularly to a thermoformed energy absorber with integrally formed attachment structure and other coined structures for attachment to a reinforcement beam in a vehicle bumper system. However, the present invention is not contemplated to be limited to only energy absorbers, nor to only vehicle bumper systems. The present invention further relates to thermoform processes and apparatus for forming integral attachment structures and/or other coined structures of different thickness than the initial thickness of a thermoformed sheet.

Thermoforming processes offer the ability to reform flat thermoplastic sheet material into a three-dimensional sheet shape at low cost and with relatively short lead times and low cost for tooling. However, thermoformed products are limited to a thickness of the initial sheet, with formed areas often being stretched to thicknesses considerably less than the initial sheet thickness. Notably, thermoforming processes become more difficult as sheet thicknesses increase, because the sheets become increasingly difficult to uniformly heat, to control while hot, to uniformly shape, and to control while cooling. In particular, the sheets become difficult to accurately control to a final shape due to complex stress patterns that result from stretching, forming, and cooling (including stress caused by stretching and by non-uniform cooling due to location and/or three-dimensional shapes). Further, tooling and apparatus for thermoformed components are generally limited to vertical movement, such that undercuts, blind surfaces, and parts with non-uniform thickness and complex shapes are not possible. As a result, "complex" parts are usually injection molded.

Relatively "weak" releasable thermoformed snap features have been formed in thin gauge thermoplastic material by thermoforming, such as deli trays whose nominal base thickness is less than 1 mm, where the snap feature includes a thin-walled hollow protrusion (i.e., considerably less than 1 mm wall thickness of the initial sheet due to stretching during the thermoforming process). Increasing the sheet thickness is typically not possible in these applications, both due to cost and also because these snap features become dramatically more difficult to control as the raw material sheet thickness increases beyond 1 mm. However, "hollow post" snap features formed in a 1 mm sheet have a high variability in the amount of retention force. This can render the feature non-functional for long term retention due to a highly-variable inconsistent retention force. There are instances where such features are used to temporarily adhere one-half of a "clamshell" to another. However, snapping into small holes or slots in a mating component has proven to be an even bigger challenge for thermoformed products since only the material directly above the feature is available for forming. Specifically, once the material is pulled into these small features by the vacuum and pressures of traditional/known thermoforming processes, the walls are typically so thin that little engagement or retention force is supplied by the snap. Further, traditional thermoforming processes are unable to form substantial undercuts and structures with blind surfaces. Alignment of mating connecting features is also problematic since it is difficult to accurately control hole locations in a thermoformed sheet. For all of these reasons, permanent attachment features have often been adhered to thermoformed product through expensive secondary operations, such as by various plastic joining methods such as glue, sonic welding, melt bonding, hot plate welding, heat staking, vibration welding, RF welding, and the like. These secondary operations often make the thermoformed product too expensive as compared to other manufacturing methods, such as injection molded thermoplastic products for high volume applications.

Thermoforming processes include additional limitations. For example, it is difficult and/or impossible to efficiently, reliably, easily and accurately locate trim holes formed in secondary hole-forming operations in the thermoformed part in relation to the formed "snap-in" features on the part. Trimming holes in-line requires a robust system to remove slugs of material on every single part, which has historically proven very difficult. Secondary operations, even those done outside of the thermoforming line, are more reliable, but result in an added tooling and processing expense that often makes the thermoformed product too expensive and uncompetitive as compared to other manufacturing methods, such as injection molded thermoplastic materials, particularly for high volume applications. These secondary operations include laser trimming, water jet trimming, NC cutting, matched metal trim dies, contoured kiss cut dies and the like.

As noted above, formed thermoformed snap features for thin gauge materials, less than 1.0 mm in base starting thickness, have been used to attach deli "clamshell" tray features. The most commonly used feature is a male formed cone on one-half of the clamshell with minimal draft angle (1-5 degrees) and a female formed square depression with minimal draft angle (1-5 degrees) that has rounded corners. A "shallow" undercut on the non-tool side of the plastic sheet of both the male and female features forms naturally as a result of the thermoforming process. When the two halves are snapped together, the formed features typically provide a retention force that is just about equal to but slightly higher than the engagement force. The snap is engaged at the tangent points where the round male meets the square sides of the female depression. Due to the light gauge of the base material, the straight walls of the female depression flex outward during insertion and extraction. This snap is effective for applications where one may want to snap and unsnap the product several times while filling the tray and removing item from it. However, it is generally unsuitable where a permanent attachment or an easy-to-assembly difficult-to-remove attachment is required.

Muirhead U.S. Pat. No. 6,718,888 describes an alternative methodology to relying on natural undercuts in the part to adhere two separate plastic halves. Muirhead '888 concerns an effort to produce a thermoformed pallet assembly where the two halves are snapped together by integral structures. Muirhead '888 describes incorporating "action" into one or both halves of the tool to form an undercut while the tool is closed. The undercut retracts prior to ejection in order to avoid a "die lock" condition where the snap feature could be elongated or distorted during the ejection process. A problem is that the mechanism is relatively complex, expensive to construct, difficult to control during the forming process, and difficult to maintain. Further, the mechanism relies on air pressure and vacuum to pull the material into the undercut feature, which limits the geometries one can select from for making snap attachments. Further, the snap feature that is formed has a thickness limited to a thickness of the starting sheet material. Further, it is difficult to control the wall stock of the snap feature since the forming process is essentially one sided, including a difficulty in controlling a final shape and position of the snap feature.

SUMMARY OF THE PRESENT INVENTION

In one aspect of the present invention, a thermoforming apparatus is provided for shaping a sheet of thermoplastic material having a generally constant first thickness. The apparatus includes at least one heater arranged to heat the sheet to a temperature suitable for thermoforming the sheet by stretching and shaping, and a thermoforming station including opposing coining die components and further including a mechanism for bringing the opposing coining die components together. The coining die components, when closed together, are configured to first capture a section of material of the sheet and then squeeze and fluidize the captured section of heated material to flow into a three-dimensional structure defined by the opposing coining die components, thus leaving a thinned area where the captured material was taken from.

In another aspect of the present invention, a method of thermoforming comprises steps of providing a sheet of thermoplastic material having a generally constant first thickness, heating at least a portion of the sheet to a temperature suitable for thermoforming the sheet by stretching and shaping, and then shaping the sheet by a thermoforming process. The method further includes forming at least one attachment on the sheet by first capturing a section of material of the sheet between coining die components and then squeezing and fluidizing the captured section of material to flow into a three-dimensional structure defined by the coining die components, thus leaving a thinned area where the captured material was taken from.

In another aspect of the present invention, a thermoformed energy absorber includes a sheet of thermoplastic material having a generally-constant first thickness dimension but stretched and shaped by a thermoforming process to include a base and lobes of reduced side wall thickness extending from the base, the lobes being configured to absorb energy upon impact in a direction generally perpendicular to the base. The sheet further includes at least one integrally formed attachment formed into the sheet, on either or both of the base and the lobes, that protrudes from the sheet and that includes a coined solid head formed from material flowed laterally from adjacent areas into the attachment during the thermoforming process.

In another aspect of the present invention, a thermoformed component includes a sheet of thermoplastic material having a generally-constant first thickness dimension but stretched and shaped by a thermoforming process to include a base and non-planar structure extending from the base. The sheet further includes at least one integrally formed section of material defining an increased mass of thickness greater than the first thickness, the increased mass being from material flowed from adjacent areas into the section of material during the thermoforming process.

In still another aspect of the present invention, a thermoformed component includes a sheet of thermoplastic material having a generally-constant first thickness dimension but stretched and shaped by a thermoforming process to include a base and a non-planar structure extending from the base. The non-planar structure includes a first section forming a ring-shaped ridge around a thin center region, a second section forming a protruding attachment with head configured to fit through the thin center region and frictionally engage the ring-shaped ridge, and a thinned area forming a living hinge between the first and second sections. By this arrangement, the second section can be bent around the living hinge into engagement with the first section, thus creating a secure looped attachment to a mating structure without separate fasteners.

In still another aspect of the present invention, a bumper system for a vehicle includes a metal reinforcement beam with ends configured for attachment to a vehicle frame and having attachment apertures therein, and a thermoformed sheet of thermoplastic material. The sheet has a generally-constant first thickness dimension but is stretched and shaped by a thermoforming process to include a base and a plurality of lobes extending from the base that are configured to absorb energy upon impact in a direction generally perpendicular to the base. The sheet further includes integrally formed attachments that protrude from the base and that are positioned and shaped to mechanically and/or frictionally engage the apertures to retain the thermoformed energy absorber on a face of the beam.

In yet another aspect of the present invention, a method comprises steps of providing a sheet of material having a generally constant first thickness; heating the sheet to a temperature suitable for thermoforming the sheet by stretching and shaping; and providing a die having a desired surface profile. The method further includes stretching and shaping the sheet on the die; the step of stretching and shaping including capturing a section of heated material in the heated sheet and forcibly flowing the material from one region into another region to form a structure with increased mass and thickness greater than the first thickness.

In still another aspect of the present invention, a method comprises steps of providing a sheet of material having a generally constant first thickness, heating the sheet to a temperature suitable for thermoforming the sheet by stretching and shaping, providing a thermoforming die having a desired surface profile and that includes opposing coining die components, and coining a section of the sheet by bringing the opposing coining die components together to flow material from a first region into a second region to form a structure with changed mass in the first region and oppositely-changed mass in the second region.

In still another aspect of the present invention, a thermoforming apparatus is provided for shaping a sheet of thermoplastic material having a generally constant first thickness. The apparatus includes at least one heater arranged to heat the sheet to a temperature suitable for thermoforming the sheet by stretching and shaping, and a thermoforming station. The thermoforming station includes a mold with a desired surface profile, the mold including a supportive region with a cavity-defining receiver therein. The die station further includes a mechanism including a sleeve shaped to capture thermoplastic material on the supportive region and including a plunger shaped to force the captured material to flow into the cavity-defining receiver while the captured material is still heated from the at least one heater.

In still another aspect of the present invention, a thermoforming apparatus is provided for shaping a sheet of thermoplastic material having a generally constant first thickness. The apparatus includes at least one heater arranged to heat the sheet to a temperature suitable for thermoforming the sheet by stretching and shaping, and a thermoforming station. The thermoforming station includes a mold with a desired surface profile, the mold including an opposing coining die components. The apparatus further includes a mechanism for bringing the opposing coining die components together to flow material from a first region into a second region to form a three-dimensional structure with changed mass in the first region and oppositely-changed mass in the second region.

In another aspect of the present invention, a thermoforming apparatus is provided for shaping a sheet of thermoplastic material having a generally constant first thickness. The apparatus includes at least one heater arranged to heat at least a portion of the sheet to a temperature suitable for thermoforming the sheet by stretching and shaping, and a thermoforming station with tooling forming a supportive region on one side of the sheet and forming a sleeve and a plunger on an opposite side of the sheet. At least one of the plunger and the supportive region define a cavity. The station further includes a mechanism configured to motivate one of the sleeve and the supporting region together to capture a volume of heated thermoplastic material of the sheet and then to motivate the plunger to fluidize and force the captured material to flow into the cavity while the captured material is still heated from the at least one heater, thus leaving a thinned area where the captured material was taken from.

An object of the present invention is to achieve positively located attachment features in a thermoformed part which do not require the removal of any material from the part and that can be formed in-line without secondary operations. In particular, these features include coined snap features and coined membranes. While these features have been designed primarily for the robust attachment of thermoformed product to metal and plastic components, it can be appreciated that the features described in this disclosure would allow the thermoformed product to compete with high volume injection molded products in any market which requires robust integrated snap attachments and/or holes at a lower cost than previous generations of thermoformed product.

These and other aspects, objects, and features of the present invention will be understood and appreciated by those skilled in the art upon studying the following specification, claims, and appended drawings.

BRIEF DESCRIPTION OF DRAWINGS

FIG. 4 further showing a mating thinned area for receiving the snap attachment.

FIGS. 14-15 are fragmentary perspective and cross-sectional views of another modified snap attachment with enlarged solid head.

FIG. 16 is a fragmentary perspective view of another modified snap attachment.

FIGS. 17-18 are fragmentary perspective and cross-sectional views of another modified snap attachment with opposing halves each having an enlarged solid head.

DETAILED DESCRIPTION OF PREFERRED

Figure 1:
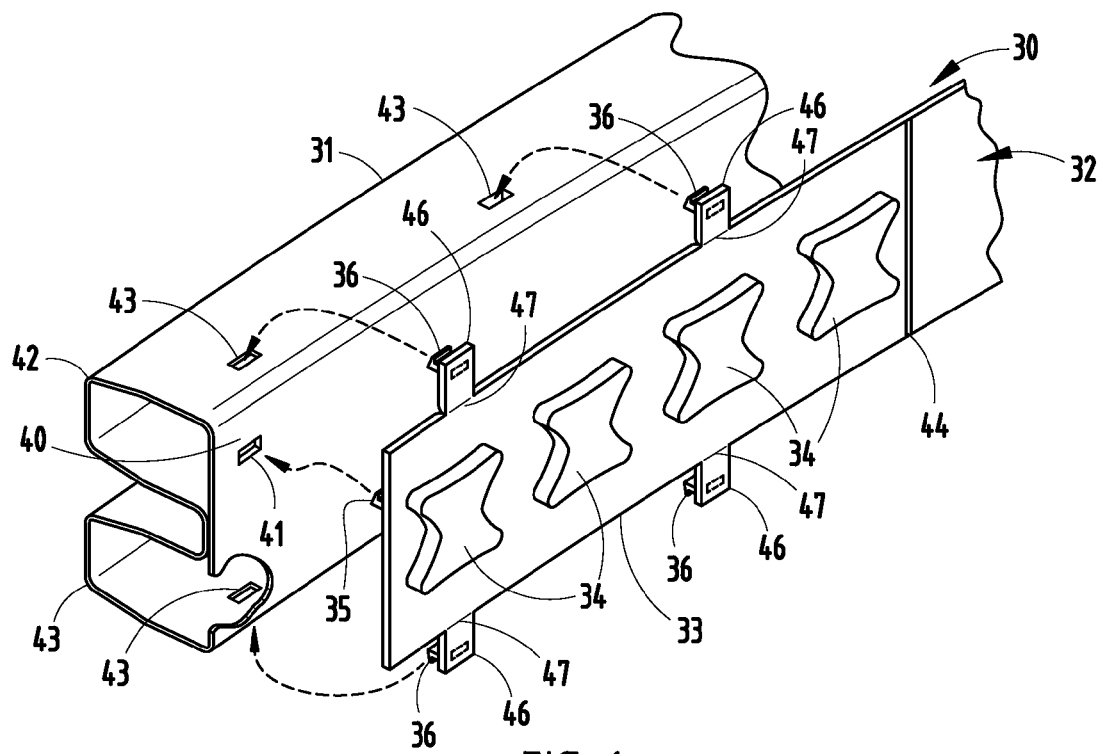
FIG. 1 is a perspective view of a bumper system embodying the present invention, including a roll-formed reinforcement beam and a thermoformed energy absorber, the energy absorber including a base, energy-absorbing crush lobes extending forward from the base and integrally formed snap-shaped attachments extending rearward from the base and connecting the energy absorber to the beam.

A bumper system 30 (FIG. 1) embodying the present invention includes a B-shaped roll-formed reinforcement beam 31 and a thermoformed energy absorber 32 formed from a sheet of thermoplastic material of constant thickness attached to its face. The energy absorber 32 includes a base 33, a plurality of X-shaped forwardly-formed energy-absorbing crush lobes 34 extending from the base 33, and a plurality of integrally formed "coined" snap-in attachments 35 and 36 (also called "connectors" or "fasteners" herein) extending rearward from the base 33 and connecting the energy absorber 32 to the beam 31. The attachments 35 and 36 each include an enlarged solid head forming a somewhat pointed end with an undercut surface for secure permanent engagement. The heads of the attachments 35 and 36 are shaped to slide into a hole and mechanically interlockingly snap-attach with relatively easy entry but with a high force required for removal. The heads are formed in part by material fluidized and laterally flowed from adjacent areas of the sheet into the attachments 35, 36, such that the heads include a greater mass and increased thickness dimension (in substantially all directions) than the associated area in the original sheet product. For this reason, the attachments 35, 36 are very strong and robust, providing a permanent and very positive and strong/robust engagement with and attachment to the beam 31. Notably, depending on a thickness of the ring of material around a root of the attachment, the attachment can be tipped slightly to facilitate alignment and connection to a mating snap-attached feature or hole, and can be preloaded/tensioned by the thinned trampoline-like area of the ring.

Beam 31 includes a relatively flat face 40 with attachment holes 41 for attachments 35, and top and bottom tubes 42 with attachment holes 43 for attachments 36. It is noted that the energy absorber 32 can include one or both types of attachments 35 and 36, and that the beam 31 will include an appropriate pattern of holes (41 and 43) matching the attachments 35, 36. The illustrated beam 31 is B-shaped and roll-formed, but it is contemplated that the beam 31 can be any shape, including any shape (e.g., "D," "O," "C," "I" shapes or other beam cross-sectional shape), and any material. It is also contemplated that the beam 31 can be made by roll-forming or other manufacturing process.

The illustrated beam is longitudinally straight, but it is contemplated that the beam 31 can be curved or swept. In such case, the energy absorber 32 would be curved to match. Where the energy absorber 32 is significantly curved, one or more living hinges (e.g., living hinge 44) can be made in the energy absorber 32 so that the energy absorber 32 can be thermoformed in a relatively flatter condition and then bent in one or more locations to match the curvature of the mating component when assembled. This avoids having to thermoform the energy absorber 32 with a deep drawn center region (which can be difficult to make and to control in a thermoforming process). For example, where the longitudinal sweep of the beam 31 causes the center region of the energy absorber 32 to be more than 3 or 4 inches below its ends, it may be desirable to provide a living hinge 44 at a center point or at multiple locations along its length.

Notably, it is contemplated that the energy absorber 32 includes end sections configured (e.g., curved) to engage ends of the beam 31. Still further, it is contemplated that the end sections can be connected to a main portion of the energy absorber 32 by living hinges that allow the ends sections to pivot on ends of the energy absorber 32, including potentially positioning the end sections inside an open end of the beam 31. Also, it is contemplated that the ends sections could include one or more of the attachments (35, 36) if desired.

The energy absorber can include a number of similar or different attachments. The illustrated energy absorber 32 (FIG. 1) includes two types of attachments (35 and 36). The attachments 35 are similar to that shown in FIG. 5. The attachments 36 are also similar attachments 35, but the attachments 36 are positioned on a tab 46 connected to the base 33 by a living hinge 47. This allows the attachments 36 to be formed in a direction perpendicular to a plane of the unformed sheet (see the process illustrated in FIGS. 2-4), yet allows the attachments 36 to be folded along the living hinge 47 to engage vertically facing holes 43 on the beam 31 (when the beam is in a vehicle-mounted position). At the same time, this arrangement allows the attachments 36 to be made very strong and robust as part of the thermoforming process, yet with relatively simple tooling and dies. The illustrated crush lobes 34 are X shaped, and are made on a thermoforming mold surface with similar shape, such as by a vacuum thermoforming process. However, it is contemplated that the lobes 34 can be any shape desired. Further, it is contemplated that the sides of the crush lobes 34 can be modified to include more or less undulations for increased (or decreased) energy absorption functionality. Also, the crush lobes 34 can have different heights and different lateral widths, such that they can be tuned for specific localized energy absorption capabilities and for specific fascia-supporting requirements.

Notably, it is contemplated that the attachments (35, 36) can be located anywhere on the energy absorber (32), including on the crush lobes if desired. For example, attachments on lobes or in other locations on the energy absorber (32) may be useful for attaching wiring or fascia to the energy absorber, thus eliminating (some or all) separate fasteners for attaching components to the bumper system. Further, the coined structures formed on the energy absorber can include other functional structures, such as for attaching wiring or sensors, mounts for lifting components, providing stiffened mounting sections, providing bosses for attachment (such as an apertured boss for receiving a screw, a solid boss for engagement by a nut, or a solid boss for reforming engagement by a heat staking operation) and the like.

Figure 2:
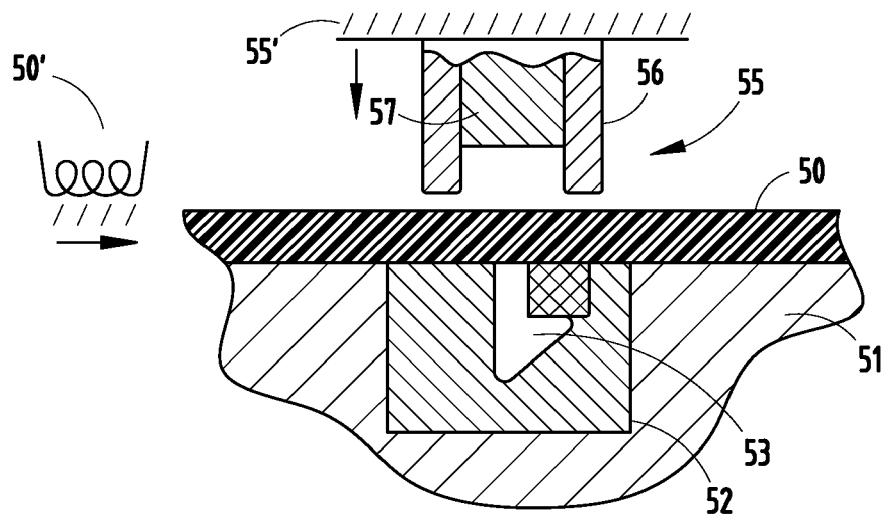
FIGS. 2-4 are side cross-sectional views showing steps in forming a particular integral snap attachment of FIG. 1, the attachment including a solid head with increased mass, increased thickness, and an undercut surface for secure mechanical snap connection to a mating aperture . . .
Figure 3:
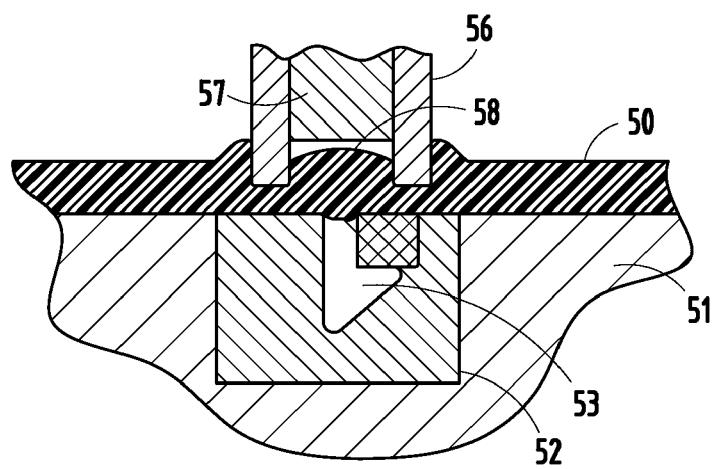
Figure 4:
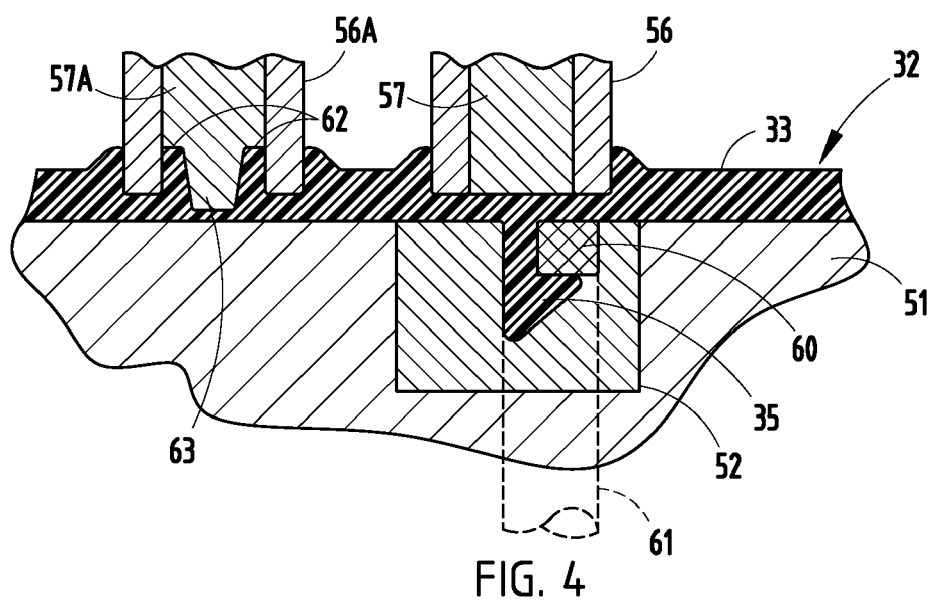

FIGS. 2-4 are side cross-sectional views showing subsequent steps in forming a particular integral attachment (e.g., attachment 35 of FIG. 1, which includes a solid stem and a solid head 37 of increased thickness and shaped for snap attachment). In FIG. 2, a heated sheet 50 heated by heater 50' is supported on (or over) a thermoforming mold tool 51 and includes a mechanism 55' for pressing the coining die components (e.g., components 52, 53, 55, 56, 57) together with sufficient pressure to capture, fluidize, and then forcibly flow the warm/hot material of the thermoformable sheet laterally. Specifically, the mold tool 51 has a supportive region with an insert 52 having a cavity-defining receiver portion, the cavity 53 defining a shape of the final attachment 35. Notably, the insert 52 is potentially made of a higher strength material than the mold tool 51 for increased durability where it must withstand somewhat higher stress and pressure during the thermoforming process than is typical for remaining parts of the tool 51.

The illustrated coining die component 55 of FIGS. 2-4 includes a sleeve 56 and plunger 57 positioned over the insert 52. As the sheet 50 is thermoformed (i.e., via vacuum, pressure, or other means via the thermoforming processes) (FIG. 3), the sleeve 56 is brought down into engagement with the insert 52 by a movement mechanism 55', trapping a slug 58 of thermoplastic material at the end of the plunger 57. The movement mechanism 55, then lowers plunger 57 (FIG. 4), fluidizing and literally pushing the slug 58 into the cavity 53. Since the sheet is still heated to a flowable temperature suitable for thermoforming, and since the slug 58 of material is trapped by the sleeve 56, the plunger 57 causes the slug 58 of material to fluidize and flow laterally toward the cavity 53, moving material of the slug 58 from adjacent areas into the cavity 53. This process is referred to herein as "coining." "Coining" and lateral flowing of material as described herein is believed to be highly unusual and counterintuitive for use in thermoforming processes since thermoforming is historically about stretching a sheet of material, and is not about capturing and fluidizing ("flowing") captured material. To the present inventors' knowledge, coining and lateral flowing of material has never been used in thermoforming to provide sections with increased mass, nor to fluidize/flow material laterally to form thickened (or thinned) portions of a sheet into an attachment with changed thickness from the original sheet. Nor has it been used to provide solid three-dimensional "solid" structures and/or attachments in a thermoformed sheet.

Experiments show that heated sheets (sufficiently heated for thermoforming) with sheet thicknesses of as low as 2 mm can provide sufficient material to flow laterally to form significant structural features of increased material mass and thickness, where the features are substantially solid and have substantially increased strength, durability, and structure, such as is suitable for permanent attachments. Our testing shows that sheets as thick as 5-6 mm or more can be used in the present process. For example in the environment of energy absorbers for attachment to metal vehicle reinforcement beams, polymeric (e.g., polypropylene) sheets with thicknesses of 2-7 mm, and more preferably 4-6 mm, and most preferably about 5 mm thickness, have provided excellent results where attachments 35 have solid posts and sharply formed snap-attachment ends with essentially perpendicularly undercut solid tips for secure permanent mechanical engagement with holes in a mating beam.

Our testing shows that in some circumstances, sheets with as low as 1 mm thickness have sufficient thermoplastic material to flow laterally and form significant 3D structures, particularly when the 3D structures include a relatively small protruding feature. This of course depends on the application and on the functional and structural requirements of the application, including flowability of the sheet material, processing temperatures of the sheet, and properties necessary in the final thermoformed part.

It is contemplated that the attachments can have a wide variety of different shapes, depending on their application and retention requirements. Notably, the insert 52 of tool 51 must be designed to release the snap-in attachment 35 (and 36) once they are formed in order to avoid die lock. This can be accomplished by providing a laterally movable slide 60 (FIG. 4) in the insert 52 that is operably connected to an actuator (such as a hydraulic or pneumatic cylinder, or such as a mechanically actuated die cam or die-shoe with angled surface that is actuated as the mechanism lowers/raises sleeve 56 similar to that often used in stamping dies). The lateral movement of slide 60 can be away from the undercut (i.e., to the right as shown in FIG. 4) or sideways from the under cut (i.e., in a direction out of the page as shown in FIG. 4). It can also be accomplished by a vertically movable slide-type plunger 61 (see dashed lines) that lifts the attachment 35 above a top of the insert 52 to a position where the attachment 35 can shift laterally (or a component of the tool can move laterally or open up) to release the attachment from the undercut/blind portion of the cavity 53. It is contemplated that it can also be accomplished by the area identified by slide 60 being a resiliently supported (spring-biased) block of material that naturally moves to a hook-forming position when the sleeve 56 is lowered, and that naturally moves to a release position when the attachment 35 is pulled out of the cavity 53.

FIG. 4 also shows a second sleeve 56A and plunger 57A, where a tip of the plunger 57A causes material of its slug to flow laterally to form a raised ring-shaped ridge 62 of solid material and a very thin center area 63. The ridge 62 has a thickness greater than the original thickness of the sheet. This allows a strong connection to be formed without wasting material, since the overall sheet thickness can be minimized while still providing sufficient structure at a connection (62/35) for a permanent connection as required by a particular application. Notably, by forming a living hinge (not shown in FIG. 4) between the hook-shaped attachment 35 and the ridge 62, the attachment 35 can be bent around the living hinge until it pierces the thin center area 63 and moves into interlocking engagement with the ridge 62. Significantly, both structures can be integrally formed without the need for secondary processing, and further the structures are both accurately and easily formed relative to each other. A1,AMD,M As shown in FIGS. 2-4, the plunger 57 is movable between a retracted position (FIG. 2), an intermediate extended position first contacting the sheet (shortly after the position shown in FIG. 3 as the plunger moves further downward), and a fully extended position (FIG. 4) in the sleeve. Notably, the plunger 57 has a transverse cross section continuously slidably engaging the sleeve to permit the extension of the plunger and further sized so that fluidized captured material cannot flow between the sleeve 56 and the plunger 57 when the plunger 57 is moved from the intermediate extended position to the fully extended position. The attachment 35 thus formed fills the cavity and has a three dimensional shape of desired size, such as the illustrated hook shape where the hook includes horizontal and vertical dimensions greater than the sheet as shown in FIG. 4. As shown in FIG. 4, the re-formed region can include a three-dimensional structure having a first area of reduced thickness in a direction perpendicular to the sheet and another second area of increased thickness in a direction perpendicular to the sheet. A biasing device can be used on the sleeve 56 and plunger 57 to bias the sleeve 56 toward an extended position relative to the plunger 57 when the sleeve 56 is not engaging the sheet. (See FIGS. 30-35.) Notably, the biasing force must not shear the captured volume of material from a remainder of the sheet as the plunger moves. (See FIG. 4 and notice that the sleeve 57 could shear the captured material if biased with too great of a force against the lower die 52.)

It is noted that modifications can be made. For example, in FIG. 4, the portion 63 formed adjacent the hook 35 could be expanded to form a shear prevention lobe, as shown by shear prevention lobe 90Z and attachment/connector 35Z in FIG. 54. As illustrated in FIGS. 2-4, the sleeve has a first material-engaging surface, the plunger has a second material-engaging surface, and the supportive region has a third material-engaging surface. The material-engaging surfaces of the sleeve 56 and the supportive region of lower die component 52 and the plunger 57, when the sleeve 56 and the supportive region 52 are closed together with the plunger 57 in the intermediate extended position (i.e. like FIG. 3 but after the plunger first contacts the sheet) define a first volume that does not include the cavity 53 formed in the lower die component 52. The material-engaging surfaces of the sleeve 56 and the supportive region on the lower die component 52 and the plunger 57, when the sleeve 56 and the supportive region are closed together with the plunger 57 in the fully extended position (FIG. 4) define a second volume that does include the cavity 53; the first and second volumes being substantially equal since the material flowing from the sheet into the cavity comes from the captured material (which does not change volume).

In subsequent disclosure, similar and identical features are identified using the same numbers but with the addition of the letter "B," "C," "D," etc. This is done to reduce redundant discussion.

Figure 5:
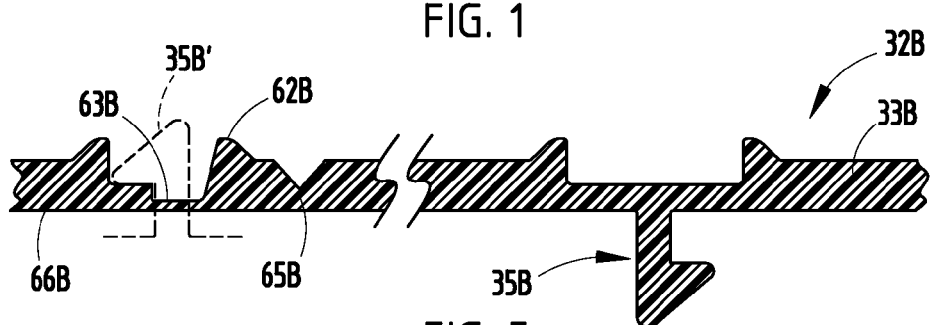
FIGS. 5-7 are side cross-sectional views disclosing modified integral attachments, with FIG. 5 also showing a living hinge and flange having a raised ring and thinned center section for receiving the attachment.
Figure 6:
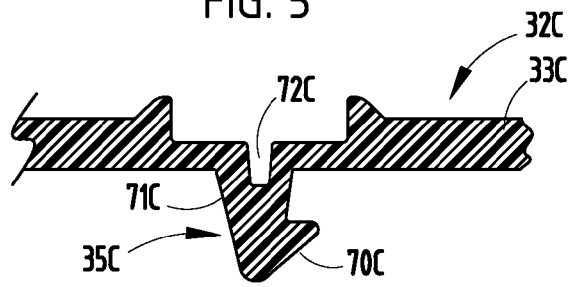
Figure 7:
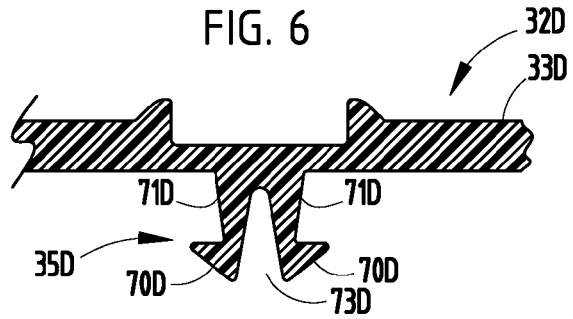

FIGS. 5-7 are side cross-sectional views disclosing additional integral attachments. The thermoformed component 32B includes an attachment 35B (FIG. 5) that is similar to the attachment 35 discussed above. The component 32B also includes a living hinge 65B and a tab/flange 66B having a raised ring 62B and a thinned center section 63B. Notably, a thickness of the living hinge 65B and of the thinned center section 63B can be controlled as part of controlling the coining process. As illustrated by the dashed lines identified as attachment 35B', the living hinge 65B can be flexed to position the attachment 35B at and pressed through the thin center section 63B to a positively interlocked permanently set condition. FIG. 6 illustrates an attachment 35C where the end portion 70C of the attachment is solid, but where a portion of the stem 71C includes a hollow portion 72C. The hollow portion 72C can extend as deep as desired, and can be any size or diameter desired, depending on the functional requirements of the attachment 35C. Notably, the stem 71C can be square, rectangular, or other cross-sectional shape, and the end portion 70C can form a hook facing a single direction, or in opposing directions, or extending 360 degrees around the stem 71C. FIG. 7 illustrates an attachment 35D where the stem 71D and end 70D are split with a V-shaped crevice 73D.

Figure 8:
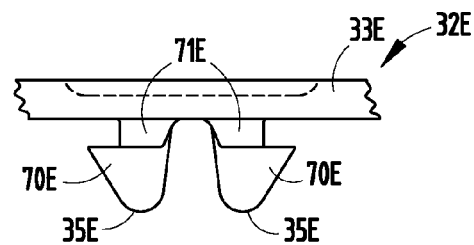
FIGS. 8-9 are side cross-sectional views of modified integrally formed attachments, the snap attachments forming oppositely facing undercuts on a protruding stem extending from in the thermoformed base, FIG. 8 showing closely spaced oppositely-facing attachments, FIG. 9 showing widely spaced oppositely-facing attachments.
Figure 9:
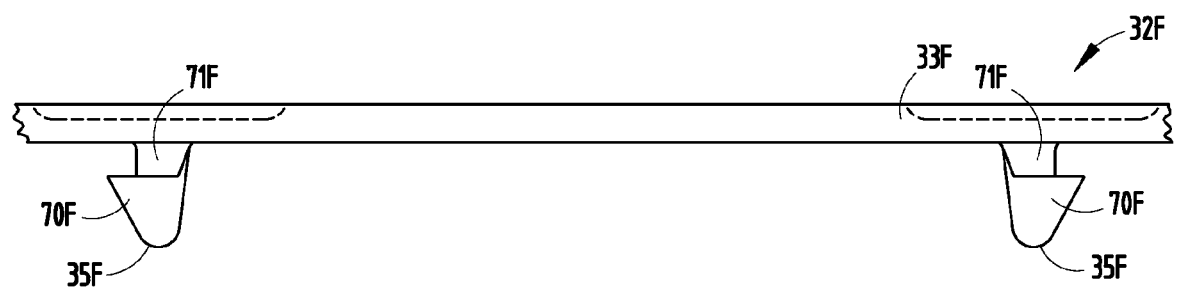

FIGS. 8-9 are side cross-sectional views of modified thermoformed components 32E and 32F, respectively, including integrally formed attachments 35E and 35F. Each attachment 35E and 35F includes a stem 71E/71F and an end portion 70E/70F. The end portions 70E/70F form oppositely facing hooks in the thermoformed base. FIG. 8 shows closely spaced opposing attachments 35E. In FIG. 8, the illustrated snap features are solid. The opposing edges of the snap would engage an individual hole or an oblate slot in the mating component. The open center section allows the two snap halves, and a portion of the base above the snap, to deflect towards the center of the hole or slot during insertion to reduce the insertion force and then flex back into a position that is approximately equal to the formed condition. The intention is to provide a retention force which is substantially greater than the insertion force making it easy for an operator to install it onto the mating component by hand or with a small assembly aid such as a hammer. Ribbing above the snap features may also be coined or formed in to reinforce the base material since the coining process will thin the material well below the base material thickness prior to thermoforming. The throat depth would be roughly equivalent to the thickness of the mating component. While the design here shows the engagement edges of the snap as essentially parallel to one another and has square corners, it can be appreciated that the angles, thickness, and radii of these areas could be changed to increase or decrease the insertion and extraction forces as desired.

FIG. 9 shows widely spaced opposing attachments 35F similar to FIG. 8 but widely spaced.

Figure 10:
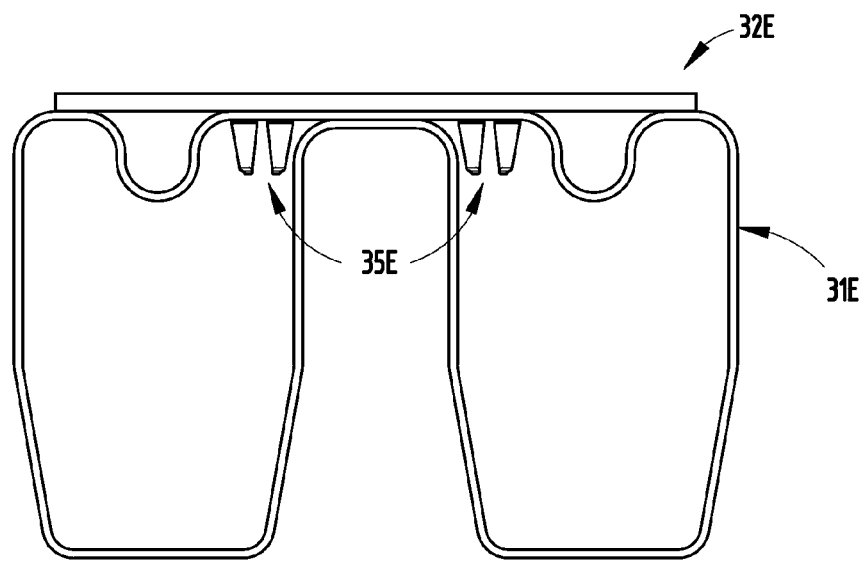
FIGS. 10-11 are vertical cross-sectional views through a bumper reinforcement beam with energy absorbers attached thereto, FIGS. 10-11 showing the attachments of FIGS. 8-9, respectively.
Figure 11:
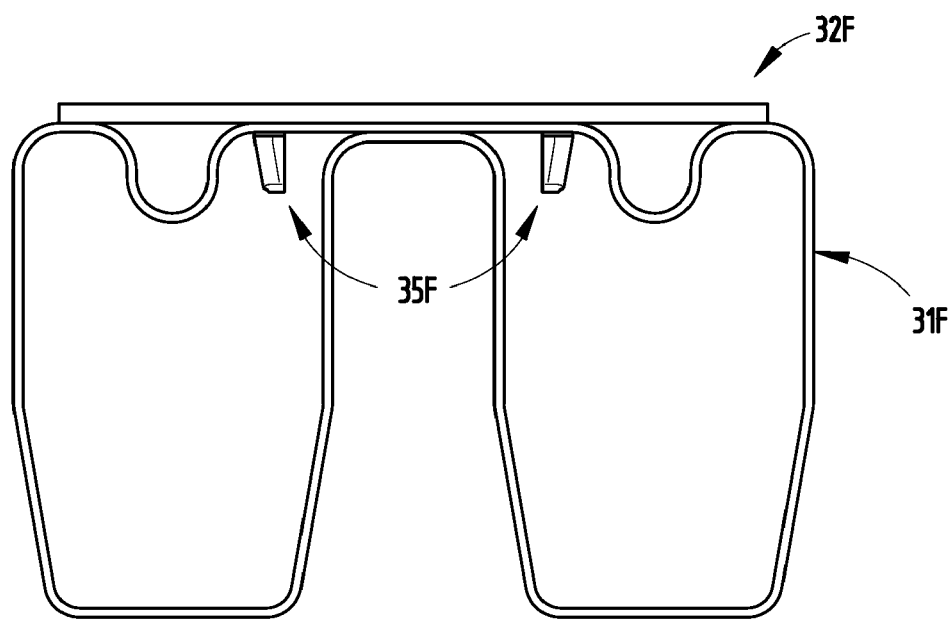

FIG. 10 is a vertical cross-sectional view through a bumper reinforcement beam 31E with energy absorber 32E attached thereto by attachments 35E. FIG. 11 is a vertical cross-sectional view through a bumper reinforcement beam 31F with energy absorber 32F attached thereto by attachments 35F. In FIGS. 9-10, the snap features are solid. The opposing edges of the snap would engage two or more holes or oblate slots in mating component. These features would engage the hole from anywhere between 1 and 75 percent of the periphery of the mating feature. For a slot, the feature would engage some between 1 to 75 percent of the slot periphery. The throat depth would be roughly equivalent to the thickness of the mating component. The single snap and a portion of the base above the snap, would be allowed to flex toward the center of the hole or slot during insertion to reduce the insertion force and then flex back into a position that is approximately equal to the formed condition. The intention is to provide a retention force that is substantially greater than the insertion force making it easy for an operator to install it onto the mating component by hand or with a small assembly aid such as a hammer. Ribbing above the snap features may also be coined or formed in to reinforce the base material since the coining process will thin the material well below the base material thickness prior to thermoforming. While the design here shows the engagement edges of the snap as essentially parallel to one another and show square corners, it can be appreciated that the angles, thickness, and radii of these areas could be changed to increase or decrease the insertion and extraction forces as desired. FIG. 11 shows particular two-sided coined snap attachments inserted in a particular "B-shaped Section" of a roll-formed bumper beam.

Figure 12:
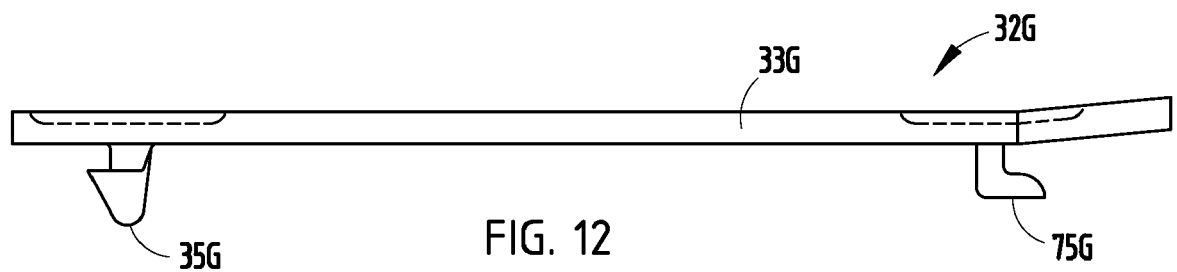
FIG. 12 is a side cross-sectional view showing a thermoformed component with a base, an L-shaped hook-shaped first attachment and a snap-in second attachment.
Figure 13:
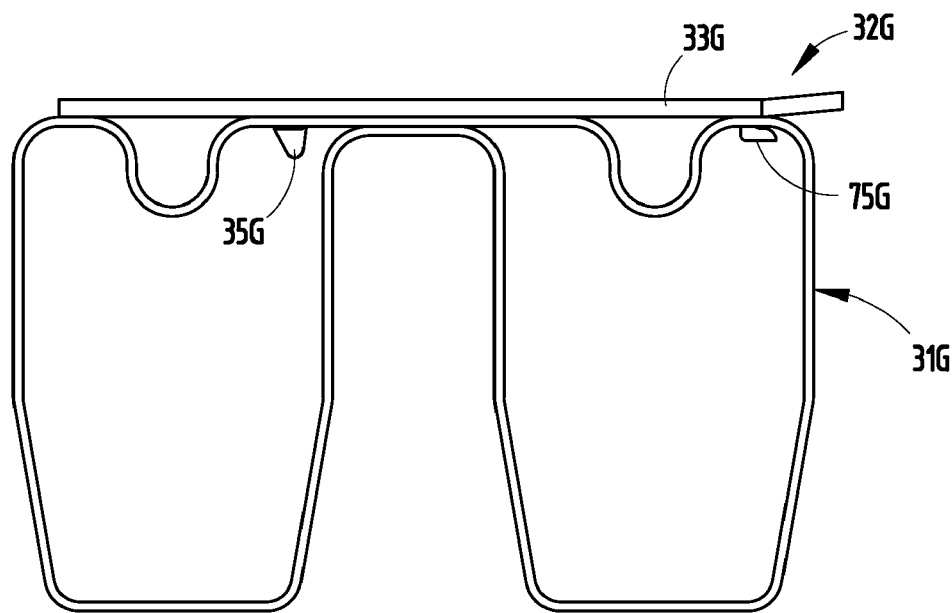
FIG. 13 is a side cross-sectional view of a reinforcement beam with the component of FIG. 12 attached.
Figure 19:
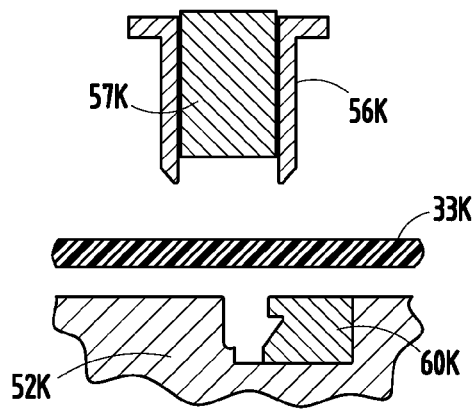
FIGS. 19-23 show steps of a method and apparatus where a thermoforming die includes opposing coining die components brought together to flow material to form a snap attachment attachment.
Figure 20:
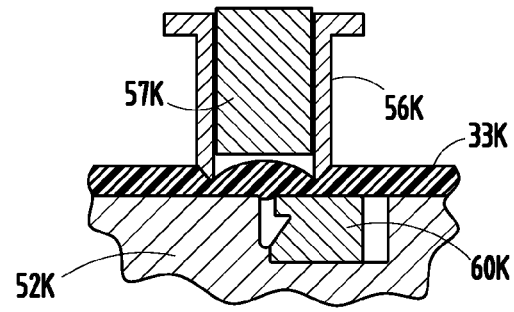
Figure 21:
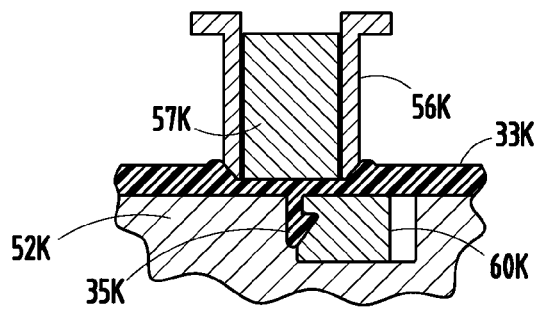
Figure 22:
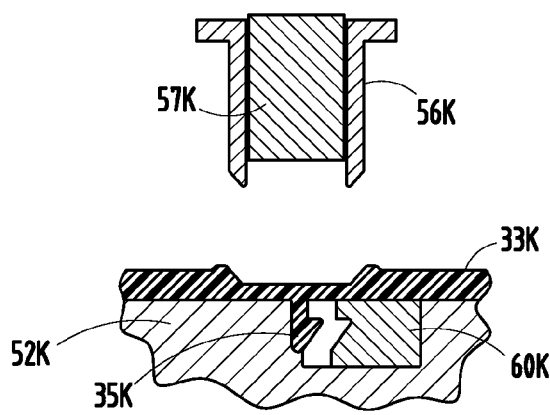
Figure 23:
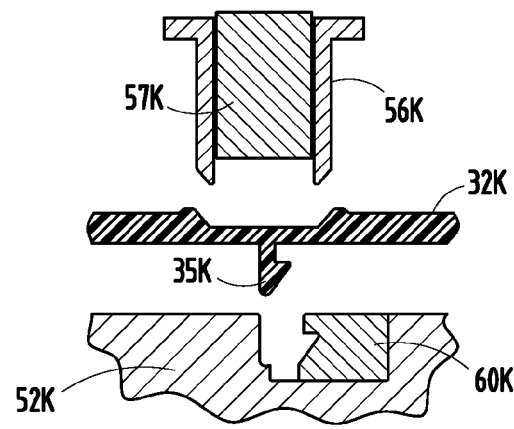

FIG. 12 is a side cross-sectional view showing a thermoformed component 32G with a base 33G, an L-shaped hook-shaped first attachment 75G and a snap-in second attachment 35G. FIG. 13 is a side cross-sectional view of a reinforcement beam 31G with the component 32G of FIG. 12 attached by the hook attachment 75G first sliding laterally into interlocked engagement, and then by snap-attaching the attachment 35G via a vertical motion directly toward the face of the beam 31G. In FIGS. 12-13, the coined attachments include two solid features. On the left-hand side, the snap described in the embodiments above is shown. The right-hand side shows an opposing hook feature. The part is rotated into position such that the hook engages one-half of the hole or slot. The opposing snap feature is then engaged by pressing down on the snap feature. These features would engage the hole from anywhere between 1 and 75 percent of the periphery of the mating feature. For a slot, the feature would engage some between 1 to 75 percent of the slot periphery. The throat depth would be roughly equivalent to the thickness of the mating component. The single snap and a portion of the base above the snap would be allowed to flex toward the center of the hole or slot during insertion to reduce the insertion force and then flex back into a position that is approximately equal to the formed condition. The intention is again to provide a retention force that is substantially greater than the insertion force making it easy for an operator to install it onto the mating component by hand or with a small assembly aid such as a hammer. Ribbing above the snap and hook features may also be coined or formed in to reinforce the base material since the coining process will thin the material well below the base material thickness prior to thermoforming. While the design here shows one embodiment of the hook and snap concept, it can be appreciated that the angles, thickness, and radii of both features could be changed to increase or decrease the insertion and extraction forces as desired.

Designs for attachment into larger holes have also been contemplated in this invention disclosure. Larger holes or slots are often provided at the ends of the bumper beam in order bolt or attach the beam/assembly onto the vehicle frame or frame rail. Rather than punch additional holes into the bumper beam, a snap feature can be thermoformed into the energy absorber with a desired percentage of engagement periphery between 10 and 100 percent of the hole or slots. These features may or may not have coined area that allow the structures to flex toward the center of the hole/slot during installation. It can again be appreciated that the angles, thickness, and radii of these areas could be changed to increase or decrease the insertion and extraction forces as desired.

FIGS. 14-15 are fragmentary perspective and cross-sectional views of another modified snap attachment 35H with enlarged solid head. In attachment 35H, the end portion 70H includes a lateral ring-shaped lip 80H that extends 360 degrees around the stem 71H of the attachment 35H. The stem 71H includes a hollow rear portion 72H. Depending on a depth of the hollow rear portion 72H, the end portion 70H can be made to allow some flexing of the lateral ring. Nonetheless, the solid head of increased thickness (greater thickness than the original thickness of the sheet) maintains a high pull-out force of attachment. FIG. 16 illustrates an attachment 351 that is similar to attachment 35H, but where the lateral interlocking lip 80I is interrupted, such as at three (or four) landings spaced around the stem 711. FIGS. 17-18 illustrate another attachment 35J similar to attachment 351, but where the stem 71J is split into opposing halves by a recess 73J, each having an enlarged solid head-forming end portion 70I. Thus, FIGS. 14-18 depict several additional embodiments of the attachments that can be made using the present inventive concepts. It is noted that the attachments and features shown in FIGS. 14-18 can each be a single solid mass without hollow portions. Alternatively it is conceived that a root of their stems may include a partial cavity/hollow portion, . . . or that an internal cavity or hollow portion may extend substantially along a desired portion of their stem toward (and even into) the respective head of the illustrated attachments. It is also contemplated that only the latching portions of the attachments may be the coined structures.

As discussed above, the present inventive concepts include a coined snap feature and/or a coined membrane, the assembly of a thermoformed component to a roll-formed bumper beam or a bumper fascia, and a thermoformed energy absorber with these coined attachment features. The present inventive concepts further include the tooling/manufacturing process for creating the aforementioned features in the product. A couple specific areas of application contemplated by the invention are the attachment of a thermoformed energy absorber with coined attachment features to roll-formed and/or stamped metal beam assemblies for automotive bumper systems along with attachment of the product to interior and/or exterior plastic trim for automotive EA applications. However, additional application and uses are contemplated, such as in an automobile or vehicle (e.g., wheel liners, heat shields, belly pans, trim components), and/or in furniture, food containers, packaging, household appliances, safety guards for machines, and in other uses where flat panels or thermoformed panels are used.

One challenge in the thermoforming process is the piercing of holes or other shapes for secondary attachment to a mating component. Rather than trimming a hole or some other shape into the part, the molten sheet of material can be coined during the forming process while the material is still malleable (as detailed in FIGS. 4-5). During coining, it has been shown that the material can be thinned over a desired area or shape into a very thin membrane (e.g., less than 0.25 mm). This allows piercing through the membrane with the male attachment feature from the male mating component with a minimal amount of force. The thickness of the material outside the coined membrane can also be controlled through coining such that a desired thickness can be achieved for positive engagement of a snap feature.

Relative to coined snaps and coined holes on the same part, it is anticipated that these features could be used in combination to adhere one portion of a part to itself. Providing a part with a coined snap, a coined hole, and one or more coined living hinges could result in a low cost modular energy absorber that still has excellent packaging density during transport to the assembly location. The part could then be snapped together at the assembly plant either prior to, or during the installation onto the mating component. This could prove useful in bumper applications where an area of the part, such as the ends of the energy absorber, drives an increase in the base material thickness of the energy absorber. Coining snaps and slots in the part would allow the part to be manufactured from a lighter gauge of material and then snapped "clamshell" to create a "doubler" in order to minimize the weight of a bumper energy absorber along with minimizing the component manufacturing cost while still allowing the parts to nest during shipment.

Figure 24:
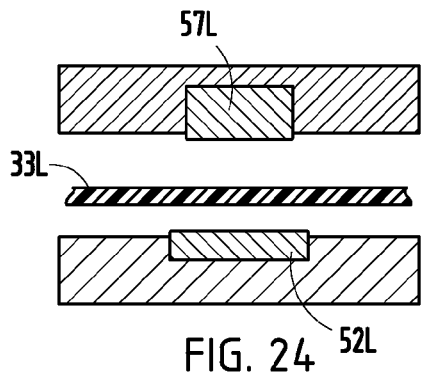
FIGS. 24-26 show steps of a method and apparatus where a thermoforming die includes opposing coining die components brought together to flow material to form a coined membrane of desired thickness, the illustrated thickness being a pierceable thin film of material.
Figure 25:
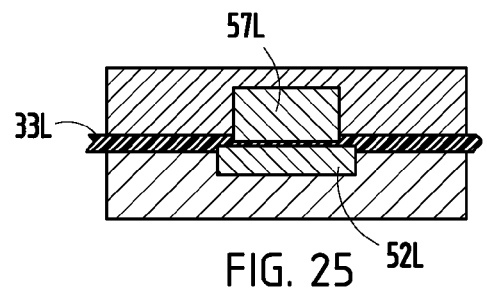
Figure 26:
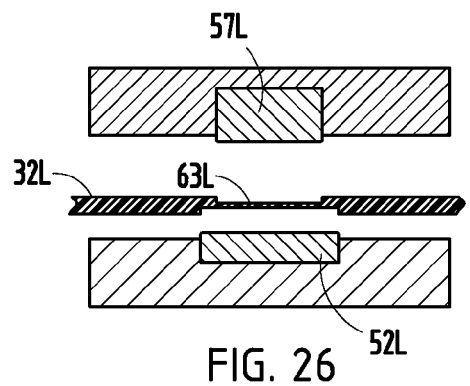
Figure 27:
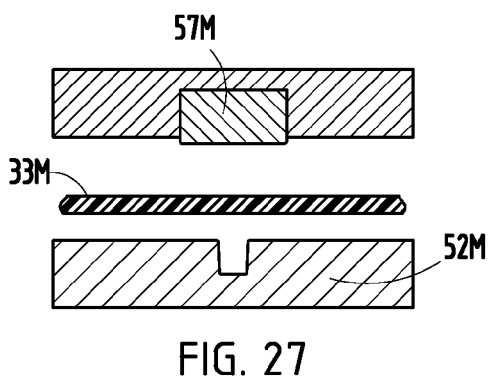
FIGS. 27-29 show steps of a method and apparatus where a thermoforming die includes opposing coining die components brought together to flow material to form a boss, such as for use as a heat staking boss or for use as an apertured boss for receiving a screw or locating boss.
Figure 28:
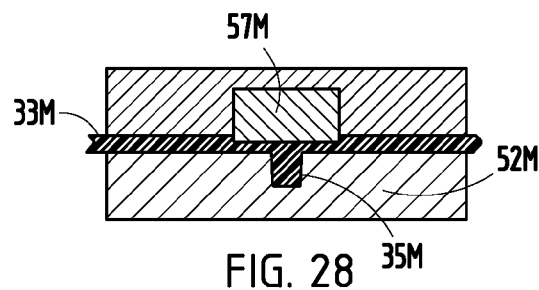
Figure 29:
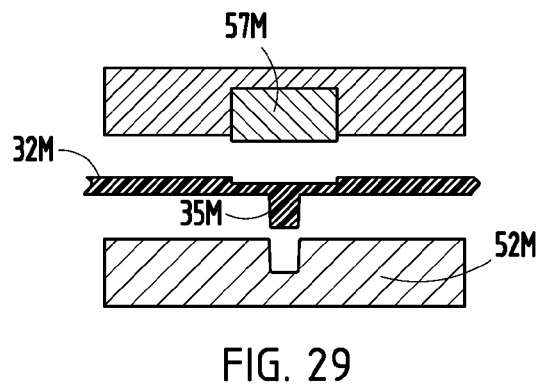
Figure 30:
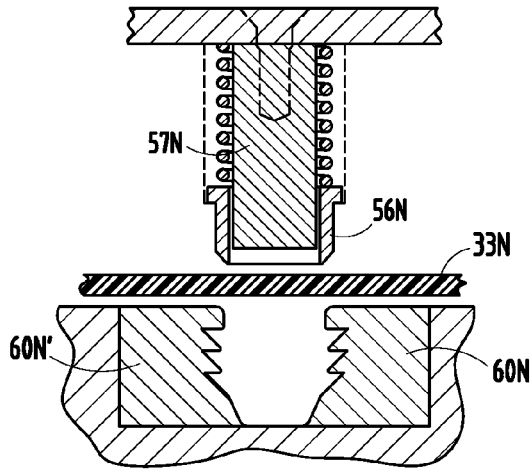
FIGS. 30-35 show steps of a method and apparatus similar to FIGS. 19-23, except the bottom coining die components include opposing die members brought together to finish form a section of coined thermoplastic material partially flowed into a cavity defining a "Christmas-tree" style push-in attachment with oppositely facing frictionally-engaging webs.
Figure 31:
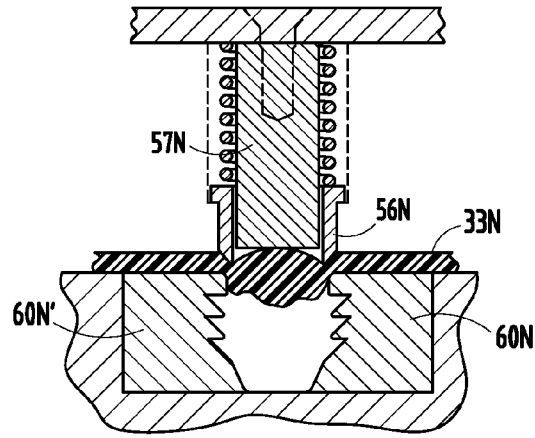
Figure 32:
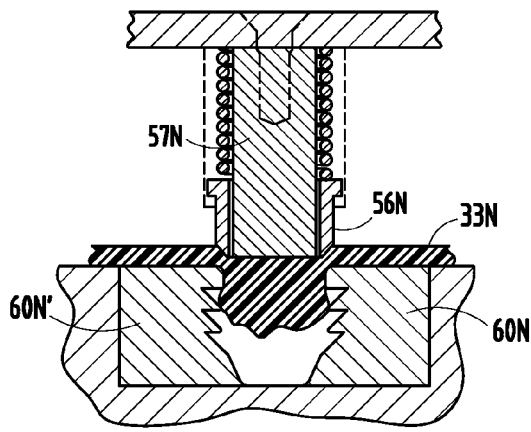
Figure 33:
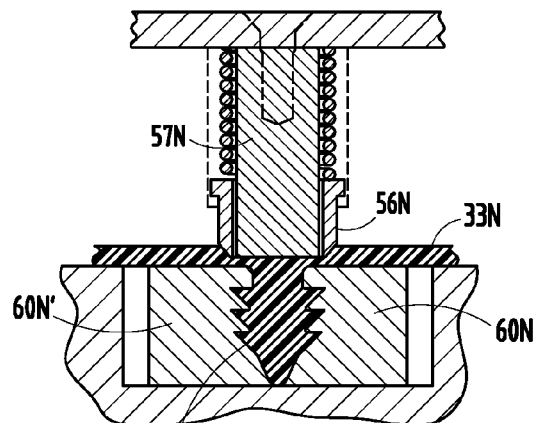
Figure 34:
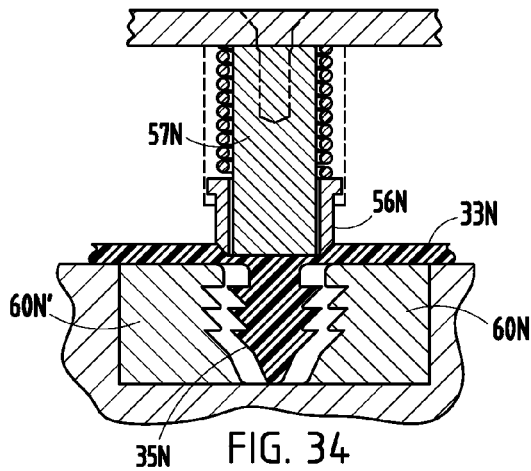
Figure 35:
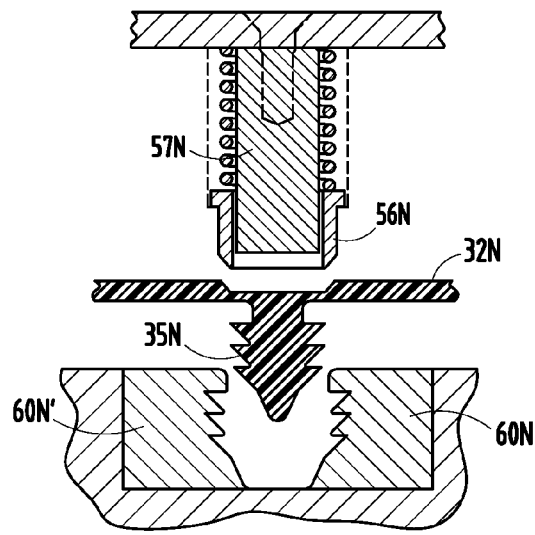

FIGS. 19-23 show a method and apparatus where a thermoforming die includes opposing coining die components 52K, 56K, 57K, 60K brought together to flow material into a snap attachment 35K. FIGS. 24-26 show a method and apparatus where a thermoforming die includes opposing coining die components 52L, 57L brought together to flow material to form a coined membrane 63L of desired thickness, the illustrated thickness being a pierceable thin film of material. FIGS. 27-29 show a method and apparatus where a thermoforming die includes opposing coining die components 52M, 57M brought together to flow material to form a boss/attachment 35M, such as for use as a heat staking boss or for use as an apertured boss for receiving a screw.

FIGS. 30-35 show a sheet 33N formed into a thermoformed component (e.g., an energy absorber) with a double-sided "Christmas tree" type attachment 35N formed by opposing bottom coining die components 60N and 60N' and top coining die components 56N (sleeve) and 57N (plunger). The bottom coining die components 60N and 60N' are illustrated as being biased together after the coined plastic material is partially flowed into the cavity to further form the laterally flowed material. However, it is contemplated that they could be biased together before the plastic material is pushed into the cavity, such that the laterally-flowed coined material directly forms the pin/Christmas tree-type fastener/attachment 35N. It is contemplated that the barbs of the attachment 35N could lie in a single plane and be located on opposing sides of the attachment stem, or that the barbs could extend up to 360 degrees around the stem. It is contemplated that the die components 56N and 57N can be mounted on a moveable platen, with the sleeve 56N mounted on a biasing spring so that the sleeve 56N presses against the sheet 33N with desired force to capture a slug of heated thermo-plastic material, while the plunger 57N continues to move (relative to the sleeve 56N) thus squeezing and fluidizing/flowing the captured slug of material into the cavity formed by the components 56N, 57N, 60N, 60N' to form the attachment 35N.

Figure 36:
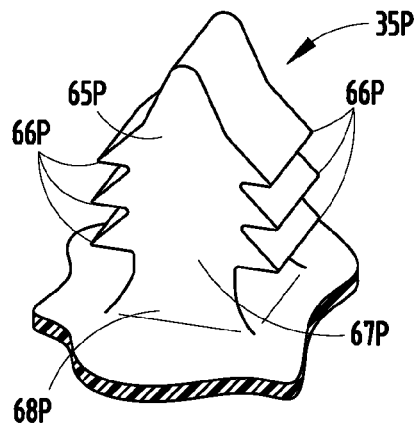
FIGS. 36-37 are side views of a tree-shaped fastener/attachment and a single-sided fastener/attachment.

FIG. 36 is a perspective view of a planar tree-shaped double-sided attachment 35P with pointed tip to facilitate push-in installation. The attachment 35P has opposing flat side surfaces 65P defining parallel planes, and further includes a plurality of retention barbs 66P lying between the planes on opposing sides of its stem 67P. Notably, it is contemplated that the retention barbs 66P each can extend to a same length from the stem 67P or can extend to different lengths from the stem 67P; and further the barbs 66P and stem 67P can be different lengths, shapes, and spacings, depending on requirements of a particular application. Notably, a base 68P (also called "root") of the attachment 35P includes a radiused surface on all four sides leading to the stem 67P, in order to minimize stress on the stem 67P when the stem is bent toward a side, such as during installation of the attachment 35P into a hole, and to optimize long term durability and robustness.

Figure 37:
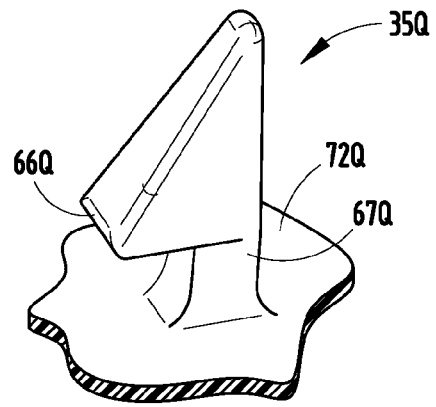
Figure 38:
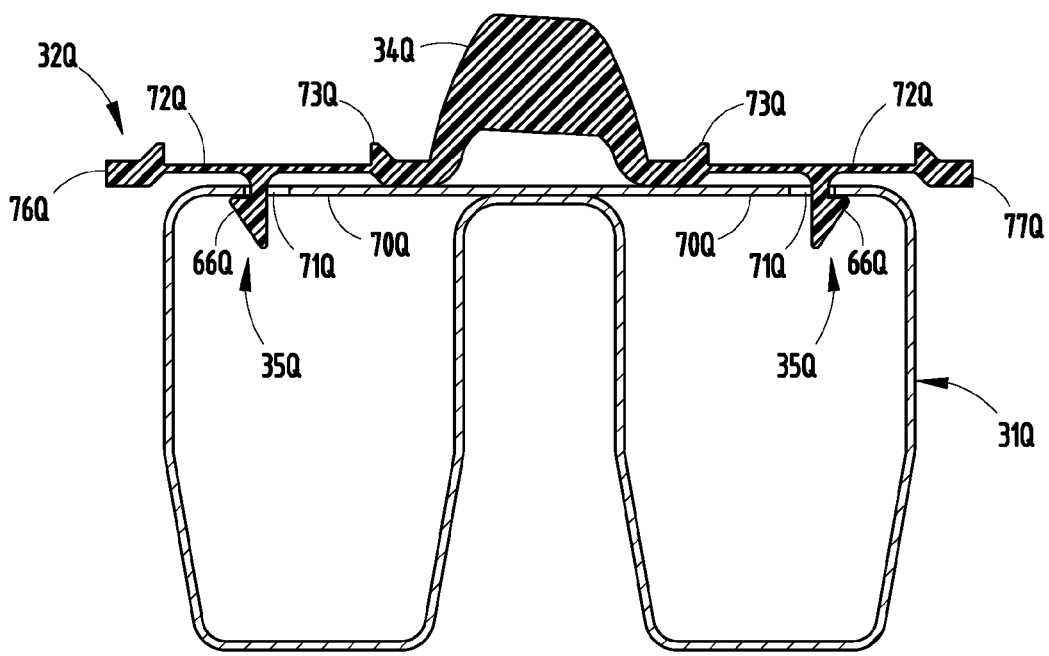
FIG. 38 shows an energy absorber including the attachment of FIG. 37.

The attachment 35Q of FIG. 37 is a single-sided attachment similar to attachment 35P, but with a single retention barb 66Q formed only on a single side of its stem 67Q. FIG. 38 shows an energy absorber 32Q attached to the front wall 70Q of a metal B-shaped reinforcement beam 31Q for a bumper system. The energy absorber 32Q includes a pair of spaced-apart attachments 35Q with barbs 66Q facing in opposite directions and positioned to snap into mating holes 71Q in the front wall 70Q of the beam 31Q. The thinned area 72Q around the stem 67Q is caused by the coining operation, where material is captured and forced from the area 72Q into the shape of the attachment 35Q. The thinned area 72Q is flexible and spaced from the front wall 70Q of the beam 31Q by a ring of thicker material 73Q that extends around the thinned area 72Q. The thicker material 73Q can be equal to or thicker than the original sheet of material being thermoformed. The thinned area 72Q provides increased resilient support to the attachment 35Q, much like a "trampoline" effect, allowing the attachment 35Q to tip toward a side as it is snapped into the mating hole 71Q in the front wall 70Q. As illustrated, each attachment 35Q is positioned to engage a hole in a portion of the front wall 71Q over a center of each tube in the B beam 31Q. The ring of thicker material 73Q that extends around each attachment 35Q engages the front wall 71Q for a majority of a length around the attachment 35Q. The energy absorber 32Q further includes a forwardly extended (hollow) pyramid-shaped projection forming an energy-absorbing crush box 34Q over a center web of the beam 31Q. It is contemplated that portions 76Q and 77Q of the energy absorber 32Q that extend above and below the beam 31Q can be formed as desired, such as to form tabs with living hinges and with attachments (not shown) that can be bent around into engagement with top and bottom walls of the B beam 31Q for supplemental attachment.

Figure 39:
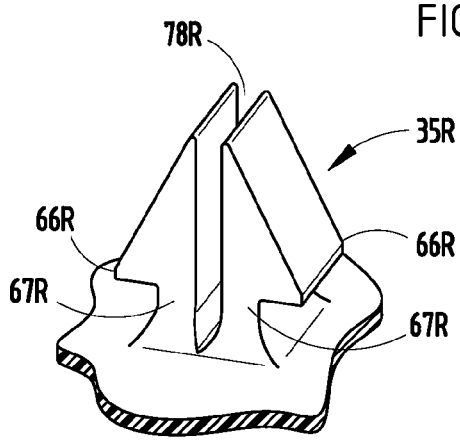
FIGS. 39-41 are side views of additional attachments.

FIG. 39 is a perspective view of a double-sided coined attachment/attachment 35R similar to attachment 35P, but with the stem 67R split by a longitudinal cavity 78R. Barbs 66R extend from each side. In effect, the attachment 35R is formed by two oppositely facing attachments 35R that are positioned very close together (i.e., spaced apart by a cavity 78R).

Figure 40:
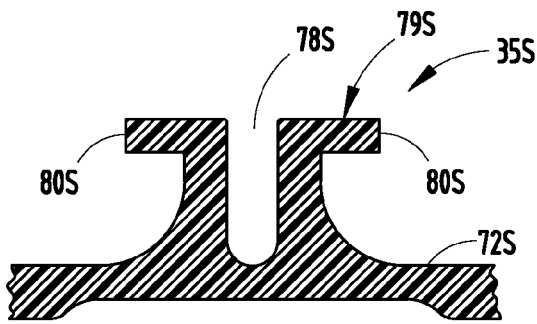

The attachment 35S (FIG. 40) is similar to attachment 35P, but attachment 35S includes a flat head 79S formed by oppositely facing coplanar flanges 80S separated by cavity 78S and supported by thinned area 72S. The attachment 35S is configured to mate with a slot having a large end and small end, where the attachment head 79S fits into the large end, and when slid to the small end is positively retained. (See FIGS. 50-51.) Notably, the head 79S can be solid (i.e., cavity 78S eliminated).

Figure 41:
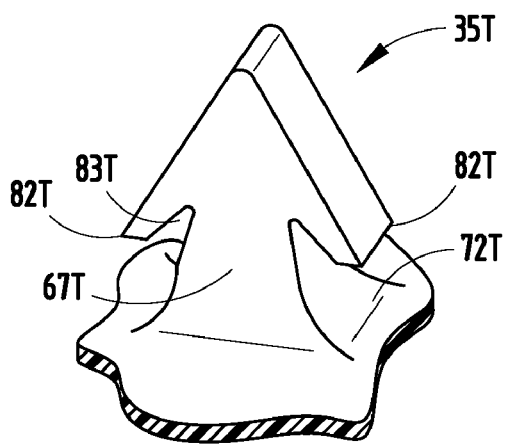

The attachment 35T (FIG. 41) is similar to attachment 35Q, but attachment 35T only has a single barb 82T on each side and further there is an undercut 83T under the end of each barb 82T adjacent stem 67T and thinned area 72T. As a result, the tips of the barbs 82T are sharper and have more "bite" when engaged. Further, depending on a shape of the barbs 82T, the tips can have some flexibility. For example, where the tips are flexible, they can reduce a force required for installation and at the same time increase the retention force (i.e., increase the force required for pull out).

Figure 42:
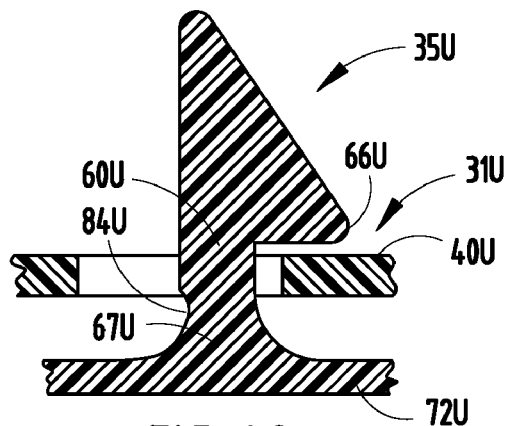
FIG. 42 is a side view of a one-sided snap attachment with radiused undercut at its root that facilitates flexure of the attachment's stem and concurrent head movement to assist in snap attachment.

The attachment 35U (FIG. 42) is similar to attachment 35Q (FIG. 37) in that it is a single-sided attachment with a retention barb 66U formed only on a single side of its stem 67U, for engaging the wall 40U of beam 31U. However, attachment 35U further includes an undercut relief 84U (i.e., a radius extending into the stem) formed on one side of the stem 67U adjacent its root and at a location opposite the barb 66U. This relief 84U can be as deep or shallow as desired. The illustrated relief 84U causes the stem 67U to have a reduced thickness near its root. This allows the stem 67U to flex during installation, thus allowing the barb 66U to move partially out of the way (e.g., toward a center of a hole in a B-shaped bumper beam) and then to move back into a position of full engagement once fully inserted into the hole. When there are opposing attachments (see FIG. 38), this arrangement can greatly reduce forces required for installation, greatly reduce a likelihood of damage to the attachment during installation, and further facilitate full engagement and maximum retention strength.

Figure 43:
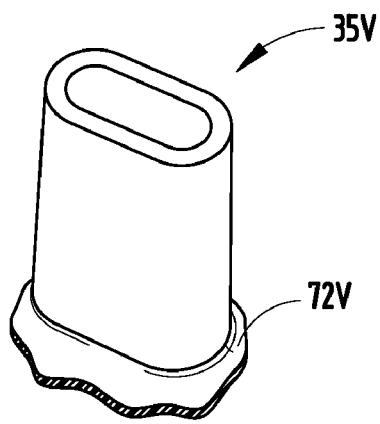
FIGS. 43-44, 45-46, and 47-48 are perspective views of particular attachments and then engagement of the attachment with a structure having a mating hole.
Figure 44:
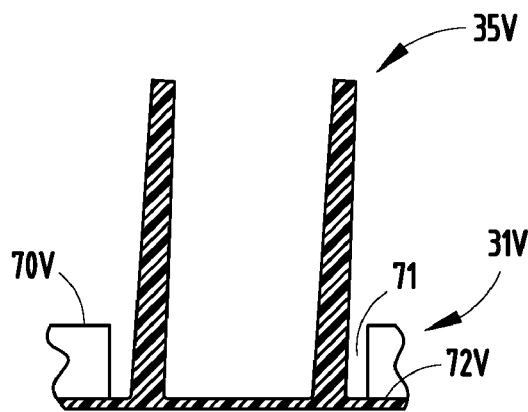

The shapes that can be formed by the present coining process are not limited to barbed attachments. FIGS. 43-44, 45-46, and 47-48 are perspective views of different attachments and their engagement with a structure having a mating hole. FIG. 43 illustrates a coined hollow post attachment 35V formed in thinned area 72V, and FIG. 44 illustrates its engagement with a hole 71V in a panel/front wall 70V of a part/beam 31V. A cross section of the post attachment can be virtually any shape desired. In the illustrated post 35V, the cross section has an obround shape (i.e., formed by spaced semi-circular ends connected by a linear sides) that is about 5-6 times the wall thickness in one direction and about 10-12 times the wall thickness in a perpendicular direction, and further where the boss height is about 10-15 times the wall thickness. Notably, a thickness of the wall and the wall height can be varied as desired. Where the aperture boss attachment has a circular cross section, it can be made to receive a self-threading screw.

Figure 45:
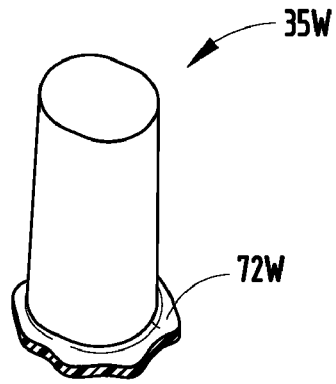
Figure 46:
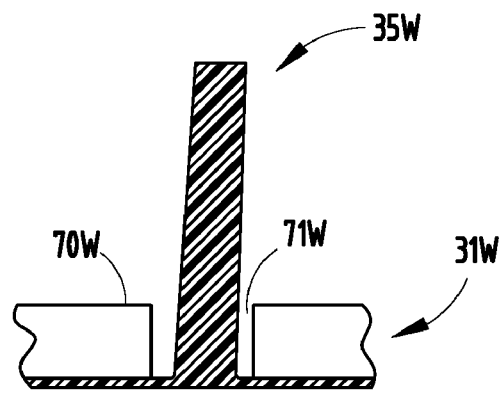

FIG. 45 illustrates a coined solid post attachment 35W formed in thinned area 72W, and FIG. 46 illustrates its engagement with a hole 71W in a panel/front wall 70W of a part/beam 31W. The solid attachment 35W can act as a locating boss to facilitate alignment during installation, such as to align an energy absorber (see FIG. 38, energy absorber 32Q) with a beam (31Q) before pressing its connectors (35Q) into the mating holes in the beam (31Q).

Figure 47:
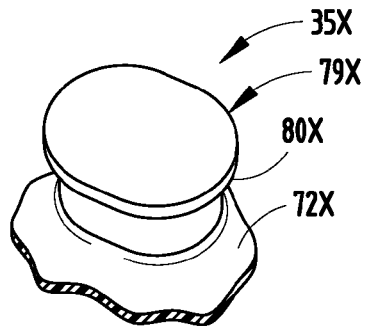
Figure 48:
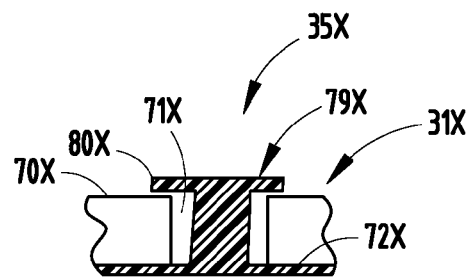

FIG. 47 illustrates a coined solid flat-headed post attachment 35X formed in area 72X with head 79X formed by flange 80X, and FIG. 48 illustrates its engagement with a hole 71X in a panel/front wall 70X of a part/beam 31X. The solid attachment 35X is configured to slip into a large end of a hole (not illustrated in FIG. 48, but see the keyholes in FIGS. 50, 51) and then be slide to a small end of the hole for positive attachment where head 79X positively engages the panel/wall for secure attachment. Notably, though the attachment is positive, it permits removal when the parts are shifted to move the head 79X back to a large end of the hole.

Figure 49:
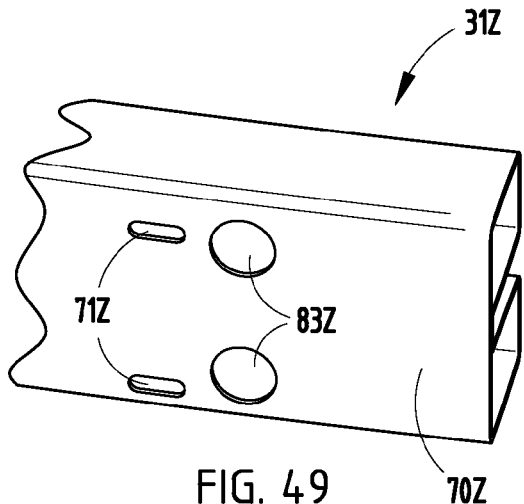
FIGS. 49-51 are perspective views of B-shaped bumper reinforcement beams, each beam having a front wall with a slot or keyhole therein for engaging an attachment on a thermoformed energy absorber.
Figure 50:
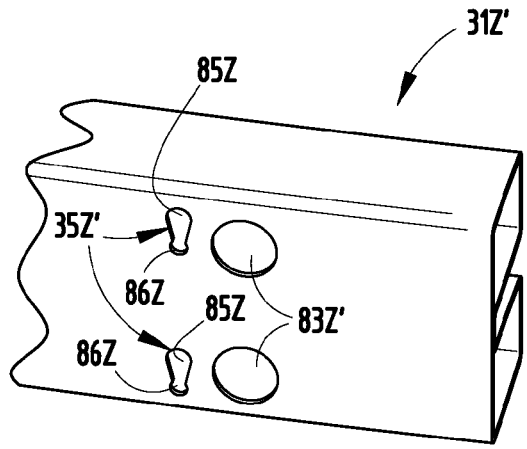
Figure 51:
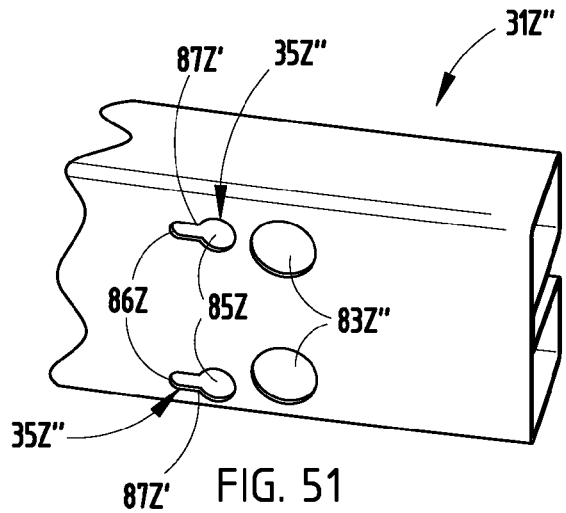

FIGS. 49-51 are perspective views of B shaped bumper reinforcement beams 31Z, 31Z', and 31Z", each beam having a front wall with a slot or keyhole therein for engaging a attachment on a thermoformed energy absorber, and further having an adjacent hole for engagement by a shear prevention lobe. Specifically, beam 31Z includes over its upper tube section a linear attachment slot/hole 71Z in the front wall 70Z of the beam 31Z, and further includes a second hole 83Z adjacent the slot/hole 71Z. The beam 31Z further includes over its lower tube section another linear attachment slot/hole 71Z in the front wall 70Z of the beam 31Z, and still further includes another second hole 83Z adjacent the slot/hole 71Z. The mating energy absorber includes top and bottom attachments (such as one-sided barb-shaped connectors 35Q) configured and located to snap engage with the slots/holes 71Z. The mating energy absorber also includes top and bottom shear prevention lobes (see FIGS. 53-54) which engage the secondary holes 83Z. The shear prevention lobes are shaped to engage the secondary holes 83Z and withstand relative shearing motion between the energy absorber and beam, thus saving the attachments (35Q) from being sheared off. In other words, due to the shear prevention lobes, the attachments primarily only undergo forces directed perpendicular to the front wall 70Z, which increases their life and further allows their design to be made with considerable less attention to shear forces.

Beam 31Z' (FIG. 50) is similar to beam 31Z (FIG. 49), but in beam 31Z', the hole 35Z' is keyhole shaped, with a large end 85Z and a small end 86Z. The large end 85Z is shaped to receive an attachment with minimal (or zero) insertion force. Upon sliding the attachment downwardly to the small end 86Z, the connector's head positively engages the marginal material forming the keyhole, thus securely retaining the attachment in place. In keyhole 35Z', the mid-region 87Z of the keyhole 35Z' is narrowed to frictionally engage the stem of the attachment. Thus, keyhole 35Z' positively prevents shifting of an attachment across the mid-region 87Z to provide a more positive retention of the attachment in the narrow end 86Z. Contrastingly, the mid-region 87Z' on the keyhole 35Z" (FIG. 51) is a same size as the small end 86Z.

It is contemplated that the beam 31Z can include a variety of differently oriented slots and/or differently shaped slots, and that the mating connectors can be optimally configured to fit easily into the slots and then slid to a secured positively-retained position. For example, the slots 71Z, 35Z', and/or 35Z" (FIGS. 49-51) could instead be L-shaped, or T-shaped, etc. In such event, the slot would define a first region that is shaped to receive the mating connector (e.g., connector 35Z) for easy installation force, and would include a second region that is shaped to receive and positively engage the mating connector (e.g., connector 35Z) when the mating energy absorber is translationally slid to the second region. For example, the connector 35Z could be shaped similar to any of the previously described connectors, instead of the specific single-sided hook-shaped connector shown in FIG. 53.

Figure 52:
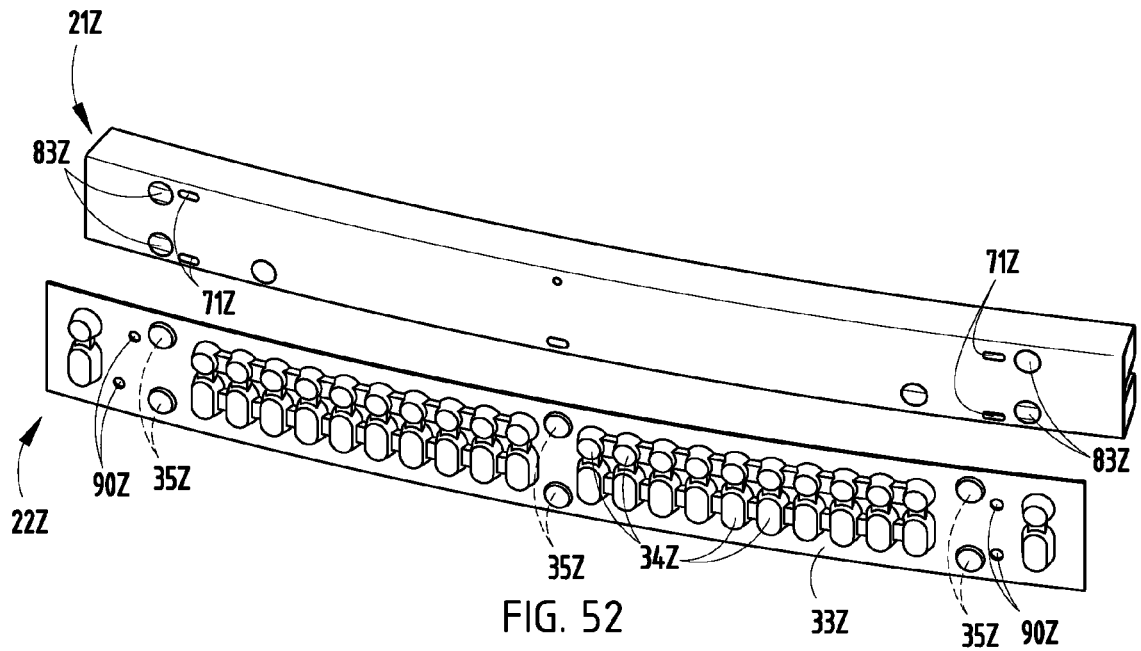
FIG. 52 is a perspective view of the B beam shown in FIG. 49 and with an energy absorber positioned for engagement with a face thereof.

FIG. 52 is a perspective view of an energy absorber 32Z including coined attachments 35Z and adjacent shear prevention lobes 90Z at each end of the energy absorber 32Z. There are additional attachments 35Z at intermediate locations on the energy absorber 32Z. The beam 31Z includes slot/holes 71Z and second holes 83Z positioned for mating engagement with the features 35Z and 90Z. A plurality of energy-absorbing lobes 34Z (twenty-two being shown) project forwardly from the base sheet 33Z of the energy absorber 32Z. The lobes 34Z are each configured to crush to provide energy absorption during an initial stroke of impact against the bumper system. The illustrated lobes 34Z have top and bottom lobe portions that are interconnected by tunnel-shaped ribs extending between horizontally adjacent and vertically adjacent lobes, except at locations of features 35Z and 90Z. The lobes 34Z are configured to both absorb energy and also are configured to support fascia positioned to cover the beam and energy absorber (i.e., the bumper system) for aesthetics.

It is noted that the illustrated beam 21Z (FIG. 52) and energy absorber 22Z are linear. However, the beam 21Z can be swept to include a single continuous longitudinal sweep and/or swept to a multi-curved shape (with end sections having an increased curved relative to a center section of the beam for a more aerodynamic shape), and that the energy absorber 22Z will be curved or will bend to match the beam's curvature.

Figure 53:
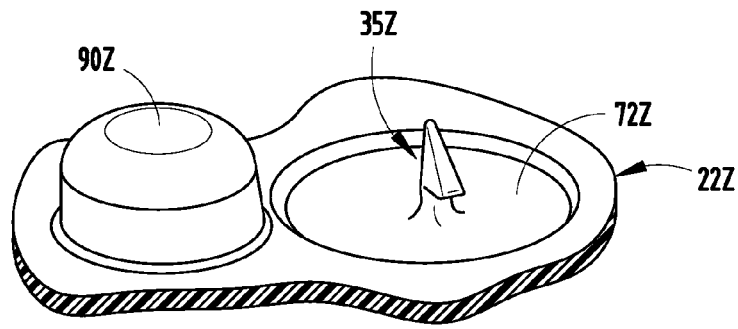
FIG. 53 is a perspective view of a component including a shear prevention lobe and coined attachment.
Figure 54:
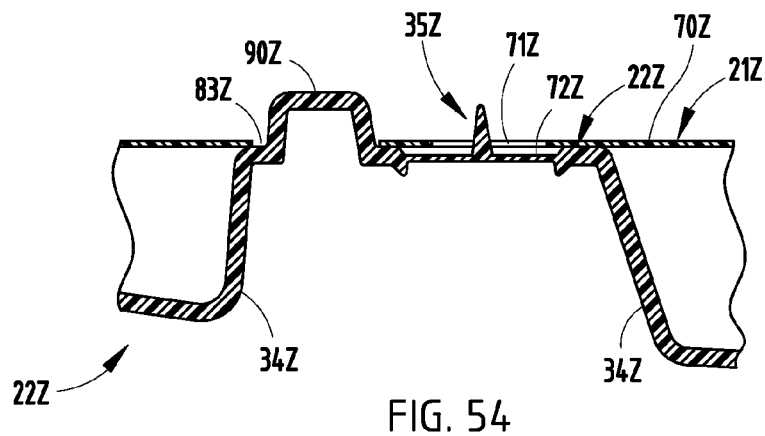
FIG. 54 is a side view of the component engaging a mating sheet metal component.

FIG. 53 is an enlarged perspective view of a section of the energy absorber 22Z having a shear prevention lobe 90Z and connector 35Z. FIG. 54 is a side cross-sectional view through FIG. 53, showing the section of the energy absorber 32Z from FIG. 52 engaging a front wall of the beam 21Z, with the shear prevention lobe 90Z and connector 35Z engaging mating holes 71Z and 83Z in the beam 21Z. Notably, the thinned area 72Z around the attachment 35Z provides flexibility allowing some lateral movement of the attachment 35Z to facilitate alignment and installation of the attachment 35Z into its mating hole 71Z. Further, the thinned area 72Z provides flexibility in a direction of installation, allowing the attachment 35Z to move with a trampoline-like motion toward the front wall of the beam 21Z in a manner both facilitating "added forward" movement of the attachment 35Z (beyond movement of the energy absorber itself) to assure positive hooking connection and further providing a support structure for the attachment 35Z that tensions the engagement by biasing the attachment 35Z with a preload after connection.

Figure 55:
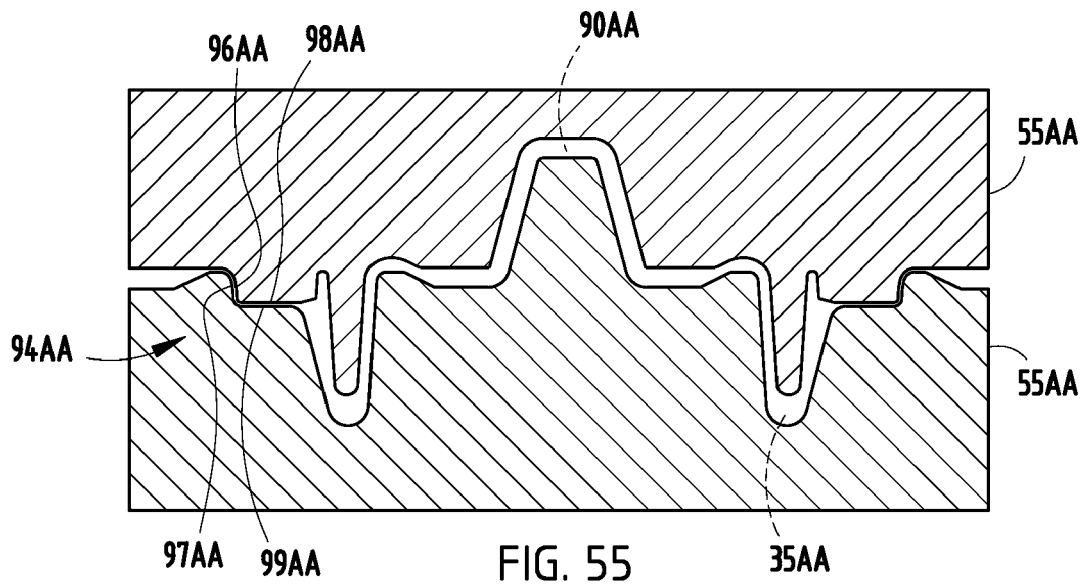
FIGS. 55-57 are side cross sectional views of an additional embodiment, FIG. 55 showing die tools in a thermoform station for capturing material on the heated sheet and flowing to a fastener (hook-shaped) cavity, FIG. 56 showing the formed part with connectors/fasteners (including locations of trimmed material), and FIG. 57 showing an installation.
Figure 56:
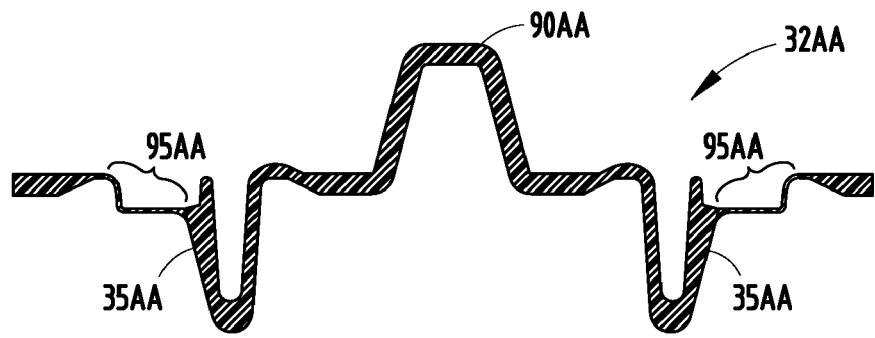
Figure 57:
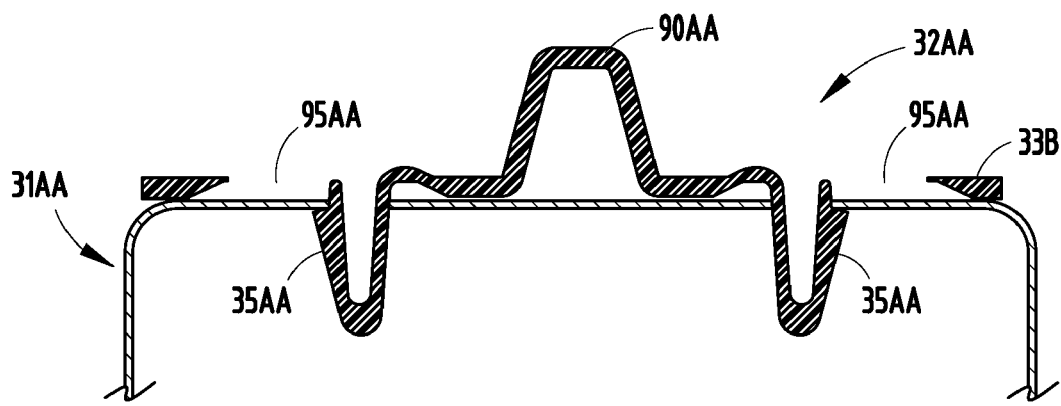

FIGS. 55-57 are side cross-sectional views of an additional embodiment similar to that shown in FIG. 53. FIG. 55 shows upper and lower die tools 55AA in a thermoform station defining a cavity for forming the connectors 35AA and protrusion 90AA, including closely-spaced mating die material at location 94AA forming a pinch area on at least one side of the (to-be-formed) connector 35AA for capturing a slug of plastic sufficiently to forcibly flow the material laterally as the tool 55AA is fully closed. Notably, the illustrated die material 94AA includes "vertical" tool surfaces 96AA-97AA that pass relatively close together prior to the die tools 55AA being fully closed. These can include relatively small draft angles for optimal function, depending on the tool requirements. These closely-spaced tool surfaces 96AA-97AA capture the slug of material prior to the tool being fully closed. Further, it is noted that the tool surfaces 96AA-97AA do not necessarily form a complete ring. As illustrated, the die tool surfaces 96AA-97AA capture the slug of material from primarily one side of the cavity, but do so with sufficient "boundary" to forcibly flow the captured slug laterally into the cavity for forming the connector 35AA. As the tools 55AA are brought together, the adjacent opposing "horizontal" tool surfaces 98AA-99AA force the captured polymeric material and forced to flow into the cavity to form the connector(s) 35AA and also the shear-preventing protrusion(s) 90A is formed.

FIG. 56 shows the formed part 32AA, with connectors/fasteners/structures 35AA and 90A fully formed. Notably, it is contemplated material at location 95AA can be trimmed away to provide increased definition to the connector 35AA and/or to add to a flexibility of its stem or supporting root area. FIG. 57 shows an installation, with the part 32AA installed in a beam 31AA, including connectors 35AA engaging respective holes/apertures/slots 71AA. Notably, in the illustration, the protrusion 90A extends forward (instead of into the front wall of the beam 31AA), such as for locating or supporting fascia on a vehicle.

Accordingly, a thermoforming apparatus (see FIGS. 2-4, 19-35, 55) is provided for shaping a sheet of thermoplastic material having a generally constant first thickness. The apparatus includes at least one heater (for example, see FIG. 2) arranged to heat at least a portion of the sheet to a temperature suitable for thermoforming the sheet by stretching and shaping, and a thermoforming station with tooling (see FIGS. 2-4,

19-35) forming a supportive region on one side of the sheet and forming a sleeve and a plunger on an opposite side of the sheet. At least one of the plunger and the supportive region define a cavity for forming a three-dimensional structure, such as an attachment (see FIGS. 1-48, 52-57). The station further includes a mechanism (FIG. 2) configured to motivate one of the sleeve and the supporting region together to capture a volume of heated thermoplastic material of the sheet and then to motivate the plunger to fluidize and force the captured material to flow into the cavity while the captured material is still heated from the at least one heater, thus leaving a thinned area where the captured material was taken from (see FIGS. 2-7, 16-37, 39-48, 53-57). The motivating mechanism can include mechanical, hydraulic, electrical or other actuator(s) for creating movement.

In another aspect, a thermoforming apparatus (see FIGS. 2-4, 19-35, 55) is provided for shaping a sheet of thermoplastic material having a generally constant first thickness. The apparatus includes at least one heater (for example, see FIGS. 2 and 5) arranged to heat the sheet to a temperature suitable for thermoforming the sheet by stretching and shaping, and a thermoforming station including opposing coining die components (FIGS. 2-4, 19-35) and further including a mechanism (for example, see FIGS. 2 and 30) for bringing the opposing coining die components together. The coining die components, when closed together, are configured to first capture a section of material of the sheet and then squeeze and fluidize the captured section of heated material to flow into a three-dimensional structure defined by the opposing coining die components, thus leaving a thinned area where the captured material was taken from (see FIGS. 2-7, 16-37, 39-48, 53-57).

In another aspect, an apparatus (see FIGS. 2-4, 19-35, 55) is adapted to form three-dimensional structures in a sheet of thermoplastic material, the sheet initially having a generally constant first thickness. The apparatus includes a thermoforming station with opposing coining die components (FIGS. 2-4, 19-35) and further including a mechanism (for example, see FIG. 2) for bringing the opposing coining die components together against opposite sides of the sheet to squeeze and fluidize a captured section of material to flow into a three-dimensional structure defined by the die components (see FIGS. 2-7, 16-37, 39-48, 53-57).

In another aspect, a method of thermoforming comprises steps of providing a sheet of thermoplastic material having a generally constant first thickness, heating at least a portion of the sheet to a temperature suitable for thermoforming the sheet by stretching and shaping (FIGS. 2-4, 19-35), and then shaping the sheet by a thermoforming process (FIGS. 2-7, 19-35, 55). The method further includes forming at least one attachment on the sheet by first capturing a section of material of the sheet between coining die components (FIGS. 2-4, 19-35, 55) and then squeezing and fluidizing the captured section of material to flow into a three-dimensional structure defined by the coining die components, thus leaving a thinned area where the captured material was taken from (see FIGS. 2-7, 16-37, 39-48, 53-57).

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A thermoforming apparatus for shaping a sheet of thermoplastic material having a generally constant first thickness, comprising:

at least one heater arranged to heat at least a portion of the sheet to a temperature suitable for thermoforming the sheet by stretching and shaping; and a thermoforming station with tooling forming a supportive region on one side of the sheet and forming a sleeve and a plunger on an opposite side of the sheet, at least one of the plunger and the supportive region defining a cavity, the station further including a mechanism configured to move one of the sleeve and the supporting region together to capture a volume of heated thermoplastic material of the sheet and then to move the plunger toward the supportive region to pressurize the captured material sufficiently to fluidize and force the captured material to flow into the cavity and take on a completely filled shape of the cavity while the captured material is still heated from the at least one heater, thus leaving a thinned area where the captured material was taken from, the plunger being movable between a retracted position, an intermediate extended position first contacting the sheet, and a fully extended position in the sleeve, and further the plunger having a transverse cross section continuously slidably engaging the sleeve during extension of the plunger so that fluidized captured material cannot flow between the sleeve and the plunger when the plunger is moved from the intermediate extended position to the fully extended position.

2. The apparatus defined in claim 1, wherein the cavity defines an attachment.

3. The apparatus defined in claim 2, wherein the attachment includes a three-dimensional shape with at least one portion thicker than the first thickness of the sheet.

4. The apparatus defined in claim 2, wherein the cavity defines a boss.

5. The apparatus defined in claim 4, wherein the boss forms one of a solid post and apertured boss.

6. The apparatus defined in claim 1, including a biasing device providing a biasing force to bias the sleeve toward an extended position relative to the plunger when the sleeve is not engaging the sheet.

7. The apparatus defined in claim 1, wherein the mechanism includes a biasing device that moves the sleeve and plunger as a unit, but where a magnitude of the biasing force is set to cause the sleeve to capture the volume of material without shearing the captured volume from a remainder of the sheet as the plunger continues to move.

8. The apparatus defined in claim 1, wherein the tooling also includes a mold surface for forming the sheet into an energy absorber with multiple crush lobes and configured to fit onto a front of a bumper beam for absorbing energy upon impact against the beam.

9. The apparatus defined in claim 1, wherein the tooling includes a first portion for forming an attachment and a second adjacent portion forming a shear-prevention lobe.

10. The apparatus defined in claim 1, wherein the supportive region and the sleeve and plunger cause the captured section of material to flow into a three-dimensional attachment structure having a same shape as the cavity.

11. The apparatus defined in claim 10, wherein the thinned area defines a ring around the three-dimensional attachment structure.

12. The apparatus defined in claim 10, wherein the three-dimensional attachment structure has a stem and an enlarged solid head on the stem.

13. The apparatus defined in claim 10, wherein the formed sheet includes hollow energy-absorbing crush lobes of reduced side wall thickness extending from a base wall, the lobes being configured to absorb energy upon impact in a direction generally perpendicular to the base wall.

14. The apparatus defined in claim 1, wherein the sleeve has a first material-engaging surface, the plunger has a second material-engaging surface, the supportive region has a third material-engaging surface;

the material-engaging surfaces of the sleeve and the supportive region and the plunger, when the sleeve and the supportive region are moved to a material-capturing position with the plunger in the intermediate extended position, defining a first volume that does not include the cavity;

the material-engaging surfaces of the sleeve and the supportive region and the plunger, when the sleeve and the supportive region are moved to a material-capturing position with the plunger in the fully extended position, defining a second volume that does include the cavity;

the first and second volumes being substantially equal.

15. The apparatus defined in claim 1, wherein the one of the plunger and the supportive region defining the cavity also including a laterally-movable slide configured to form an undercut in the cavity, the slide being movable to release the captured material after formation thereof.

16. The apparatus defined in claim 1, including a plurality of sleeves, plungers and cavities.

17. A thermoforming apparatus for shaping a sheet of thermoplastic material having a generally constant first thickness, comprising:

at least one heater arranged to heat at least a portion of the sheet to a temperature suitable for thermoforming the sheet by stretching and shaping; and a thermoforming station with tooling forming a supportive region on one side of the sheet and forming a sleeve and a plunger on an opposite side of the sheet, at least one of the plunger and the supportive region defining a cavity, the station further including a mechanism configured to move one of the sleeve and the supporting region together to capture a volume of heated thermoplastic material of the sheet and then to move the plunger to fluidize and force the captured material to flow into the cavity while the captured material is still heated from the at least one heater, thus leaving a thinned area where the captured material was taken from, the plunger being movable between a retracted position, an intermediate extended position first contacting the sheet, and a fully extended position in the sleeve, and further the plunger having a transverse cross section continuously slidably engaging the sleeve during extension of the plunger so that fluidized captured material cannot flow between the sleeve and the plunger when the plunger is moved from the intermediate extended position to the fully extended position;

wherein the cavity defines an attachment; that includes a three-dimensional shape with at least one portion thicker than the first thickness of the sheet; and wherein the portion includes a stem and an enlarged head.

18. The apparatus defined in claim 17, wherein the enlarged head defines at least one hook.

19. A thermoforming apparatus for shaping a sheet of thermoplastic material having a generally constant first thickness, comprising:

at least one heater arranged to heat at least a portion of the sheet to a temperature suitable for thermoforming the sheet by stretching and shaping; and a thermoforming station with tooling forming a supportive region on one side of the sheet and forming a sleeve and a plunger on an opposite side of the sheet, at least one of the plunger and the supportive region defining a cavity, the station further including a mechanism configured to move one of the sleeve and the supporting region together to capture a volume of heated thermoplastic material of the sheet and then to move the plunger to fluidize and force the captured material to flow into the cavity while the captured material is still heated from the at least one heater, thus leaving a thinned area where the captured material was taken from, the plunger being movable between a retracted position, an intermediate extended position first contacting the sheet, and a fully extended position in the sleeve, and further the plunger having a transverse cross section continuously slidably engaging the sleeve during extension of the plunger so that fluidized captured material cannot flow between the sleeve and the plunger when the plunger is moved from the intermediate extended position to the fully extended position;

wherein the cavity defines a stem and at least one head on an end of the stem.

20. The apparatus defined in claim 19, wherein the at least one head includes a plurality of barbs.

21. The apparatus defined in claim 19, wherein the at least one head includes opposing barbs.

22. A thermoforming apparatus for shaping a sheet of thermoplastic material having a generally constant first thickness, comprising:

at least one heater arranged to heat at least a portion of the sheet to a temperature suitable for thermoforming the sheet by stretching and shaping; and a thermoforming station with tooling forming a supportive region on one side of the sheet and forming a sleeve and a plunger on an opposite side of the sheet, at least one of the plunger and the supportive region defining a cavity, the station further including a mechanism configured to move one of the sleeve and the supporting region together to capture a volume of heated thermoplastic material of the sheet and then to move the plunger to fluidize and force the captured material to flow into the cavity while the captured material is still heated from the at least one heater, thus leaving a thinned area where the captured material was taken from, the plunger being movable between a retracted position, an intermediate extended position first contacting the sheet, and a fully extended position in the sleeve, and further the plunger having a transverse cross section continuously slidably engaging the sleeve during extension of the plunger so that fluidized captured material cannot flow between the sleeve and the plunger when the plunger is moved from the intermediate extended position to the fully extended position;

wherein the cavity defines a stem and enlarged head and further defines an undercut at a base of the stem to facilitate flexure of the stem.

23. A thermoforming apparatus for shaping a sheet of thermoplastic material having a generally constant first thickness, comprising:

at least one heater arranged to heat at least a portion of the sheet to a temperature suitable for thermoforming the sheet by stretching and shaping; and a thermoforming station with tooling forming a supportive region on one side of the sheet and forming a sleeve and a plunger on an opposite side of the sheet, at least one of the plunger and the supportive region defining a cavity, the station further including a mechanism configured to move one of the sleeve and the supporting region together to capture a volume of heated thermoplastic material of the sheet and then to move the plunger to fluidize and force the captured material to flow into the cavity while the captured material is still heated from the at least one heater, thus leaving a thinned area where the captured material was taken from, the plunger being movable between a retracted position, an intermediate extended position first contacting the sheet, and a fully extended position in the sleeve, and further the plunger having a transverse cross section continuously slidably engaging the sleeve during extension of the plunger so that fluidized captured material cannot flow between the sleeve and the plunger when the plunger is moved from the intermediate extended position to the fully extended position;

wherein the supportive region and the sleeve and plunger cause the captured section of material to flow into a three-dimensional attachment structure having a same shape as the cavity;

wherein the three-dimensional structure has at least one first area of reduced thickness in a direction perpendicular to the sheet and at least one second area of increased thickness in the direction perpendicular to the sheet.

24. The apparatus defined in claim 23, including a plurality of sleeves, plungers and cavities.

25. A thermoforming apparatus for shaping a sheet of thermoplastic material having a generally constant first thickness, comprising:

at least one heater arranged to heat at least a portion of the sheet to a temperature suitable for thermoforming the sheet by stretching and shaping; and a thermoforming station with tooling forming a supportive region on one side of the sheet and having a sleeve and a plunger on an opposite side of the sheet, at least one of the plunger and the supportive region defining a cavity, the station further including a mechanism configured to move one of the sleeve and the supporting region together to capture a volume of heated thermoplastic material of the sheet and then to move the plunger to fluidize and force the captured material to flow into the cavity and completely fills the cavity while the captured material is still heated from the at least one heater, thus leaving a thinned area where the captured material was taken from;

wherein the one of the plunger and the supportive region defining the cavity also including a laterally-movable slide configured to form an undercut in the cavity, the slide being movable to release the captured material after formation thereof.

* * * * *